(12) United States Patent
Zhou et al.

(10) Patent No.: US 11,950,160 B2
(45) Date of Patent: Apr. 2, 2024

(54) RANDOM ACCESS CHANNEL (RACH) BASED INTER-CELL MOBILITY

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/372,079

(22) Filed: Jul. 9, 2021

(65) Prior Publication Data

US 2022/0014997 A1 Jan. 13, 2022

Related U.S. Application Data

(60) Provisional application No. 63/051,140, filed on Jul. 13, 2020.

(51) Int. Cl.
*H04W 36/30* (2009.01)
*H04L 1/1607* (2023.01)
(Continued)

(52) U.S. Cl.
CPC ........... *H04W 36/30* (2013.01); *H04L 1/1607* (2013.01); *H04W 24/08* (2013.01);
(Continued)

(58) Field of Classification Search
CPC ............. H04W 36/08; H04W 36/0055; H04W 36/0058; H04W 36/0061; H04W 36/0064; H04W 36/0066; H04W 36/0072; H04W 36/0077; H04W 36/30; H04W 36/36; H04W 36/362; H04W 76/27; H04W 74/04; H04W 74/0833; H04W 24/08; H04W 24/10; H04L 1/16; H04L 1/1607
See application file for complete search history.

(56) References Cited

U.S. PATENT DOCUMENTS

2019/0387438 A1\* 12/2019 Chang ............... H04W 36/0055
2021/0058838 A1\* 2/2021 Lee ................... H04W 36/0058
(Continued)

*Primary Examiner* — Peter Chen
(74) *Attorney, Agent, or Firm* — Patterson + Sheridan, L.L.P.

(57) ABSTRACT

Aspects of the present disclosure provide a method for wireless communications by a user equipment (UE). The method generally includes receiving signaling configuring the UE with multiple candidate target physical cell identifiers (PCIs) of at least one candidate target cell, receiving signaling configuring the UE with at least one handover (HO) condition for each PCI of the multiple candidate target PCIs, detecting that an HO condition is satisfied for a target PCI of one or more target PCIs selected from the multiple candidate target PCIs for HO, initiating an HO procedure to a target cell associated with the target PCI for which the HO condition is satisfied, the HO procedure involving transmitting a random access signal on an uplink (UL) resource configured for the target PCI, and transmitting or receiving an HO complete message, via physical or medium access control (MAC) layer signaling, a handover complete message indicating completion of the HO procedure.

30 Claims, 14 Drawing Sheets

(51) Int. Cl.
  *H04W 24/08* (2009.01)
  *H04W 36/00* (2009.01)
  *H04W 36/36* (2009.01)
  *H04W 74/04* (2009.01)
  *H04W 74/08* (2009.01)
  *H04W 74/0833* (2024.01)
(52) U.S. Cl.
  CPC ....... *H04W 36/0061* (2013.01); *H04W 36/36* (2013.01); *H04W 74/04* (2013.01); *H04W 74/0833* (2013.01)

(56) References Cited

U.S. PATENT DOCUMENTS

2021/0297909 A1* 9/2021 Lee .................... H04W 74/0833
2023/0096215 A1* 3/2023 Cao ..................... H04W 36/085
                                                            370/329

* cited by examiner

| RNTI | Usage |
|---|---|
| P-RNTI | Paging and System Information change notification |
| SI-RNTI | Broadcast of System Information |
| RA-RNTI | Random Access Response |
| MSGB-RNTI | Random Access Response for 2-step RA type |
| Temporary C-RNTI | Contention Resolution (when no valid C-RNTI is available) |
| Temporary C-RNTI | Msg3 transmission |
| C-RNTI, MCS-C-RNTI | Dynamically scheduled unicast transmission |
| C-RNTI | Dynamically scheduled unicast transmission |
| MCS-C-RNTI | Dynamically scheduled unicast transmission |
| C-RNTI | Triggering of PDCCH ordered random access |
| CS-RNTI | Configured scheduled unicast transmission (activation, reactivation and retransmission) |
| CS-RNTI | Configured scheduled unicast transmission (deactivation) |
| TPC-PUCCH-RNTI | PUCCH power control |
| TPC-PUSCH-RNTI | PUSCH power control |
| TPC-SRS-RNTI | SRS trigger and power control |
| INT-RNTI | Indication pre-emption in DL |
| SFI-RNTI | Slot Format Indication on the given cell |
| SP-CSI-RNTI | Activation of Semi-persistent CSI reporting on PUSCH |
| CI-RNTI | Cancellation indication in UL |
| PS-RNTI | DCP to indicate whether to start *drx-onDurationTimer* for associated DRX cycle |

FIG. 11

RANDOM ACCESS CHANNEL (RACH) BASED INTER-CELL MOBILITY

CROSS-REFERENCE TO RELATED APPLICATION(S)

This application claims benefit of and priority to U.S. Provisional Application No. 63/051,140 filed Jul. 13, 2020, which is hereby assigned to the assignee hereof and hereby expressly incorporated by reference herein in its entirety as if fully set forth below and for all applicable purposes.

BACKGROUND

Aspects of the present disclosure relate to wireless communications, and more particularly, to random access channel (RACH) based inter-cell mobility (e.g., handover (HO)) techniques.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources (for example, bandwidth, transmit power, or other resources). Multiple-access technologies can rely on any of code division, time division, frequency division, orthogonal frequency division, single-carrier frequency division, or time division synchronous code division, to name a few.

These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. Consequently, there exists a need for further improvements in wireless communications systems to overcome various challenges.

SUMMARY

Certain aspects of the subject matter described in this disclosure can be implemented in a method for wireless communication by a user equipment (UE). The method generally includes receiving signaling configuring the UE with multiple candidate target physical cell identifiers (PCIs) of at least one candidate target cell, receiving signaling configuring the UE with at least one handover (HO) condition for each PCI of the multiple candidate target PCIs, detecting that an HO condition is satisfied for a target PCI of one or more target PCIs selected from the multiple candidate target PCIs for HO, initiating an HO procedure to a target cell associated with the target PCI for which the HO condition is satisfied, the HO procedure involving transmitting a random access signal on an uplink (UL) resource configured for the target PCI, and transmitting or receiving an HO complete message, via physical or medium access control (MAC) layer signaling, a handover complete message indicating completion of the HO procedure.

Certain aspects of the subject matter described in this disclosure can be implemented in a method for wireless communication by a network entity. The method generally includes transmitting signaling, to a UE, configuring the UE with multiple candidate target physical cell identifiers (PCIs) of at least one candidate target cell, transmitting signaling configuring the UE with at least one HO condition for each PCI of the multiple candidate target PCIs, participating in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI, and transmitting or receiving an HO complete message, via PHY layer or MAC layer signaling, the HO complete message indicating completion of the HO procedure.

Certain aspects of the subject matter described in this disclosure can be implemented in an apparatus for wireless communications performed by a UE. The apparatus generally includes: at least one processor; and a memory coupled to the at least one processor, the memory including instructions executable by the at least one processor to cause the apparatus to: receive signaling configuring the UE with multiple candidate target PCIs of at least one candidate target cell, receive signaling configuring the UE with at least one HO condition for each PCI of the multiple candidate target PCIs, detect that an HO condition is satisfied for a target PCI of one or more target PCIs selected from the multiple candidate target PCIs for HO, initiate an HO procedure to a target cell associated with the target PCI selected for HO and for which the HO condition is satisfied, the HO procedure involving transmitting a random access signal on a UL resource configured for the target PCI, and transmit or receive an HO complete message via PHY layer signaling or MAC layer signaling, the HO complete message indicating completion of the HO procedure.

Certain aspects of the subject matter described in this disclosure can be implemented in an apparatus for wireless communications performed by a network entity. The apparatus generally includes: at least one processor; and a memory coupled to the at least one processor, the memory including instructions executable by the at least one processor to cause the apparatus to: transmit signaling, to a UE, configuring the UE with multiple candidate target PCIs of at least one candidate target cell, transmit signaling configuring the UE with at least one HO condition for each PCI of the multiple candidate target PCIs, participate in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI, and transmit or receive an HO complete message, via PHY layer signaling or MAC layer signaling, the HO complete message indicating completion of the HO procedure.

Certain aspects of the subject matter described in this disclosure can be implemented in an apparatus for wireless communications performed by a UE. The apparatus generally includes: means for receiving signaling configuring the UE with multiple candidate target PCIs of at least one candidate target cell, means for receiving signaling configuring the UE with at least one HO condition for each PCI of the multiple candidate target PCIs, means for detecting that an HO condition is satisfied for a target PCI of one or more target PCIs selected from the multiple candidate target PCIs for HO, means for initiating an HO procedure to a target cell associated with the target PCI selected for HO and for which the HO condition is satisfied, the HO procedure involving transmitting a random access signal on a UL resource configured for the target PCI, and means for transmitting or means for receiving an HO complete message via PHY layer signaling or MAC layer signaling, the HO complete message indicating completion of the HO procedure.

Certain aspects of the subject matter described in this disclosure can be implemented in an apparatus for wireless communications performed by a network entity. The apparatus generally includes: means for transmitting signaling, to a UE, configuring the UE with multiple candidate target PCIs of at least one candidate target cell, means for transmitting signaling configuring the UE with at least one HO condition for each PCI of the multiple candidate target PCIs, means for participating in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI, and means for transmitting or means for receiving an HO complete message, via PHY layer signaling or MAC layer signaling, the HO complete message indicating completion of the HO procedure.

Certain aspects of the subject matter described in this disclosure can be implemented in a computer-readable medium for wireless communications including instructions that, when executed by a processing system in a UE, cause the processing system to perform operations including: receiving signaling configuring the UE with multiple candidate target PCIs of at least one candidate target cell, receiving signaling configuring the UE with at least one HO condition for each PCI of the multiple candidate target PCIs, detecting that an HO condition is satisfied for a target PCI of one or more target PCIs selected from the multiple candidate target PCIs for HO, initiating an HO procedure to a target cell associated with the target PCI selected for HO and for which the HO condition is satisfied, the HO procedure involving transmitting a random access signal on a UL resource configured for the target PCI, and transmitting or receiving an HO complete message via PHY layer signaling or MAC layer signaling, the HO complete message indicating completion of the HO procedure.

Certain aspects of the subject matter described in this disclosure can be implemented in a computer-readable medium for wireless communications including instructions that, when executed by a processing system in a network entity, cause the processing system to perform operations including: transmitting signaling, to a UE, configuring the UE with multiple candidate target PCIs of at least one candidate target cell, transmitting signaling configuring the UE with at least one HO condition for each PCI of the multiple candidate target PCIs, participating in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI, and transmitting or receiving an HO complete message, via PHY layer signaling or MAC layer signaling, the HO complete message indicating completion of the HO procedure.

Certain aspects of the subject matter described in this disclosure can be implemented in a method for wireless communication by a UE. The method generally includes receiving signaling configuring the UE with multiple selected PCIs per serving cell serving the UE, determining at least one radio network temporary identifier (RNTI) based, at least in part, on at least one selected PCI of the multiple selected PCIs serving the UE and a particular usage of the RNTI, and using the RNTI for the particular usage.

Certain aspects of the subject matter described in this disclosure can be implemented in a method for wireless communication by a network entity. The method generally includes transmitting signaling configuring a UE with multiple selected PCIs per serving cell serving the UE, determining at least one RNTI based, at least in part, on at least one selected PCI of the multiple selected PCIs serving the UE and a particular usage of the RNTI, and using the RNTI for the particular usage when communicating with the UE.

Certain aspects of the subject matter described in this disclosure can be implemented in an apparatus for wireless communications performed by a UE. The apparatus generally includes: at least one processor; and a memory coupled to the at least one processor, the memory including instructions executable by the at least one processor to cause the apparatus to: receive signaling configuring the UE with multiple selected PCIs per serving cell serving the UE, determine at least one RNTI based, at least in part, on at least one selected PCI of the multiple selected PCIs serving the UE and a particular usage of the RNTI, and use the RNTI for the particular usage.

Certain aspects of the subject matter described in this disclosure can be implemented in an apparatus for wireless communications performed by a network entity. The apparatus generally includes: at least one processor; and a memory coupled to the at least one processor, the memory including instructions executable by the at least one processor to cause the apparatus to: transmit signaling configuring a UE with multiple selected PCIs per serving cell serving the UE, determine at least one RNTI based, at least in part, on at least one selected PCI of the multiple selected PCIs serving the UE and a particular usage of the RNTI, and use the RNTI for the particular usage when communicating with the UE.

Certain aspects of the subject matter described in this disclosure can be implemented in an apparatus for wireless communications performed by a UE. The apparatus generally includes: means for receiving signaling configuring the UE with multiple selected PCIs per serving cell serving the UE, means for determining at least one RNTI based, at least in part, on at least one selected PCI of the multiple selected PCIs serving the UE and a particular usage of the RNTI, and means for using the RNTI for the particular usage.

Certain aspects of the subject matter described in this disclosure can be implemented in an apparatus for wireless communications performed by a network entity. The apparatus generally includes: means for transmitting signaling configuring a UE with multiple selected PCIs per serving cell serving the UE, means for determining at least one RNTI based, at least in part, on at least one selected PCI of the multiple selected PCIs serving the UE and a particular usage of the RNTI, and means for using the RNTI for the particular usage when communicating with the UE.

Certain aspects of the subject matter described in this disclosure can be implemented in a computer-readable medium for wireless communications including instructions that, when executed by a processing system in a UE, cause the processing system to perform operations including: receiving signaling configuring the UE with multiple selected PCIs per serving cell serving the UE, determining at least one RNTI based, at least in part, on at least one selected PCI of the multiple selected PCIs serving the UE and a particular usage of the RNTI, and using the RNTI for the particular usage Certain aspects of the subject matter described in this disclosure can be implemented in a computer-readable medium for wireless communications including instructions that, when executed by a processing system in a network entity, cause the processing system to perform operations including: transmitting signaling configuring a UE with multiple selected PCIs per serving cell serving the UE, determining at least one RNTI based, at least in part, on at least one selected PCI of the multiple selected PCIs serving the UE and a particular usage of the RNTI, and using the RNTI for the particular usage when communicating with the UE The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 11 is a table of example identifiers with corresponding uses for wireless communication, in accordance with certain aspects of the present disclosure.

DETAILED DESCRIPTION

Aspects of the present disclosure relate to wireless communications, and more particularly, to enabling random access channel (RACH) based inter-cell mobility (e.g., handover) based on signaling by a user equipment (UE). As will be described in greater detail below, certain aspects of the present disclosure provide techniques for improved conditional handover (CHO) procedures based on physical layer (PHY or Layer 1 (L1)) and/or medium access control (MAC) layer (Layer 2 (L2)) signaling by introducing RACH. In particular, whenever a HO condition is satisfied for a candidate target physical cell identifier (PCI) associated with a target cell, the UE may initiate reconfiguration with synchronization (e.g., via RACH) on uplink (UL) resources configured for that candidate target PCI.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G New Radio (NR) RAT network may be deployed.

Introduction to Wireless Communication Networks

Figure 1:
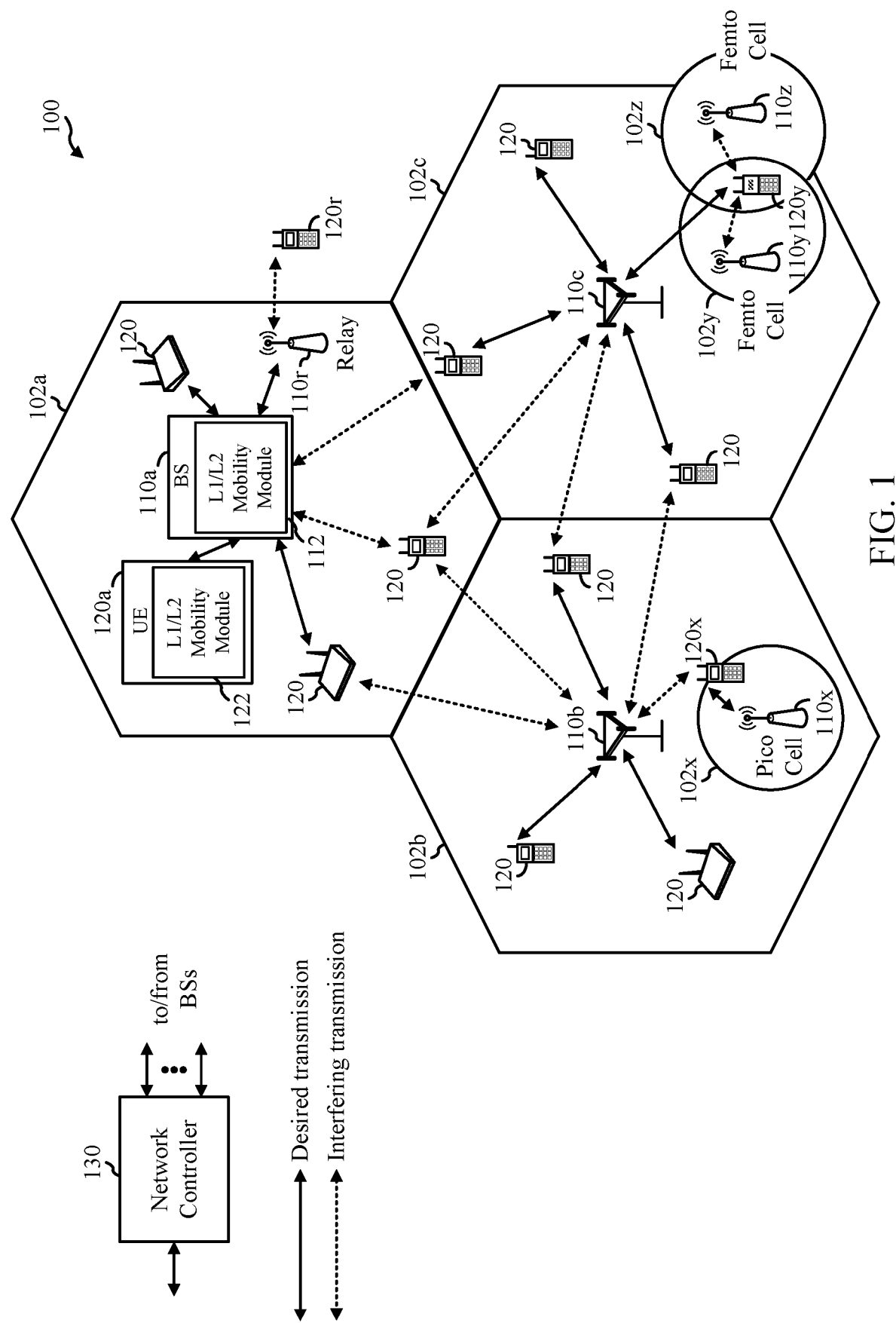
FIG. 1 is a block diagram conceptually illustrating an example wireless communication network in which certain aspects of the present disclosure may be performed.

FIG. 1 is a block diagram illustrating an example wireless communication network 100 in which aspects of the present disclosure may be performed. For example, as shown in FIG. 1, user equipment (UE) 120a may include a layer 1/layer 2 (L1/L2) mobility module 122 that may be configured to perform (or cause UE 120a to perform) operations 700 of FIG. 7 and/or operations 900 of FIG. 9. Similarly, a base station (BS) 110a may include an L1/L2 mobility module 112 that may be configured to perform (or cause BS 110a to perform) operations 800 of FIG. 8 and/or operations 1000 of FIG. 10.

New Radio (NR) access (for example, 5G NR) may support various wireless communication services, such as enhanced mobile broadband (eMBB) targeting wide bandwidth (for example, 80 megahertz (MHz) or beyond), millimeter wave (mmWave) targeting high carrier frequency (for example, 25 gigahertz (GHz) or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTIs) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
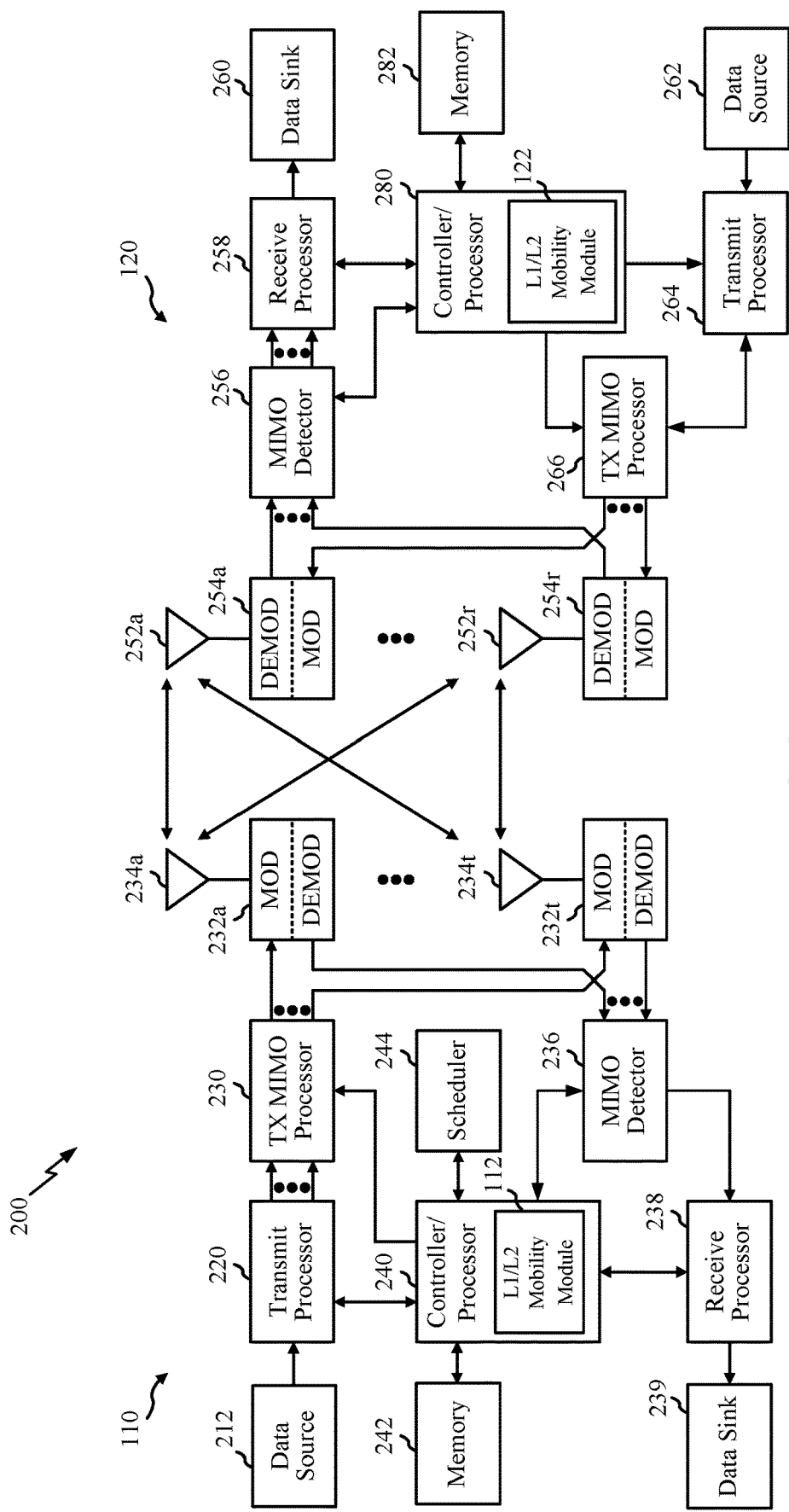
FIG. 2 is a block diagram illustrating an example base station (BS) and an example user equipment (UE), in accordance with certain aspects of the present disclosure.

FIG. 2 is a block diagram 200 illustrating an example BS and an example UE, in accordance with certain aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for orthogonal frequency division multiplexing (OFDM), etc.) to obtain an output sample stream. Each modulator may further process (for example, convert to analog, amplify, filter, and upconvert) the output sample stream to obtain a downlink (DL) signal. DL signals from modulators 232a-232t may be transmitted via the antennas 234a-234t, respectively.

At the UE 120, the antennas 252a-252r may receive the DL signals from the BS 110 and may provide received signals to the demodulators (DEMODs) in transceivers 254a-254r, respectively. Each demodulator may condition (for example, filter, amplify, downconvert, and digitize) a respective received signal to obtain input samples. Each demodulator may further process the input samples (for example, for OFDM, etc.) to obtain received symbols. A multiple-input multiple-output (MIMO) detector 256 may obtain received symbols from all the demodulators in transceivers 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink (UL), at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for single-carrier frequency division multiplexing (SC-FDM), etc.), and transmitted to the BS 110. At the BS 110, the UL signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the DL or UL.

The controller/processor 280 or other processors and modules at the UE 120 may perform or direct the execution of processes for the techniques described herein. As shown in FIG. 2, the controller/processor 280 of the UE 120 has an L1/L2 mobility module 122 that may be configured to perform (or cause UE 120 to perform) operations 700 of FIG. 7 and/or operations 900 of FIG. 9. Similarly, the BS 110 may include an L1/L2 mobility module 112 that may be configured to perform (or cause BS 110 to perform) operations 800 of FIG. 8 and/or operations 1000 of FIG. 10.

Figure 3A:
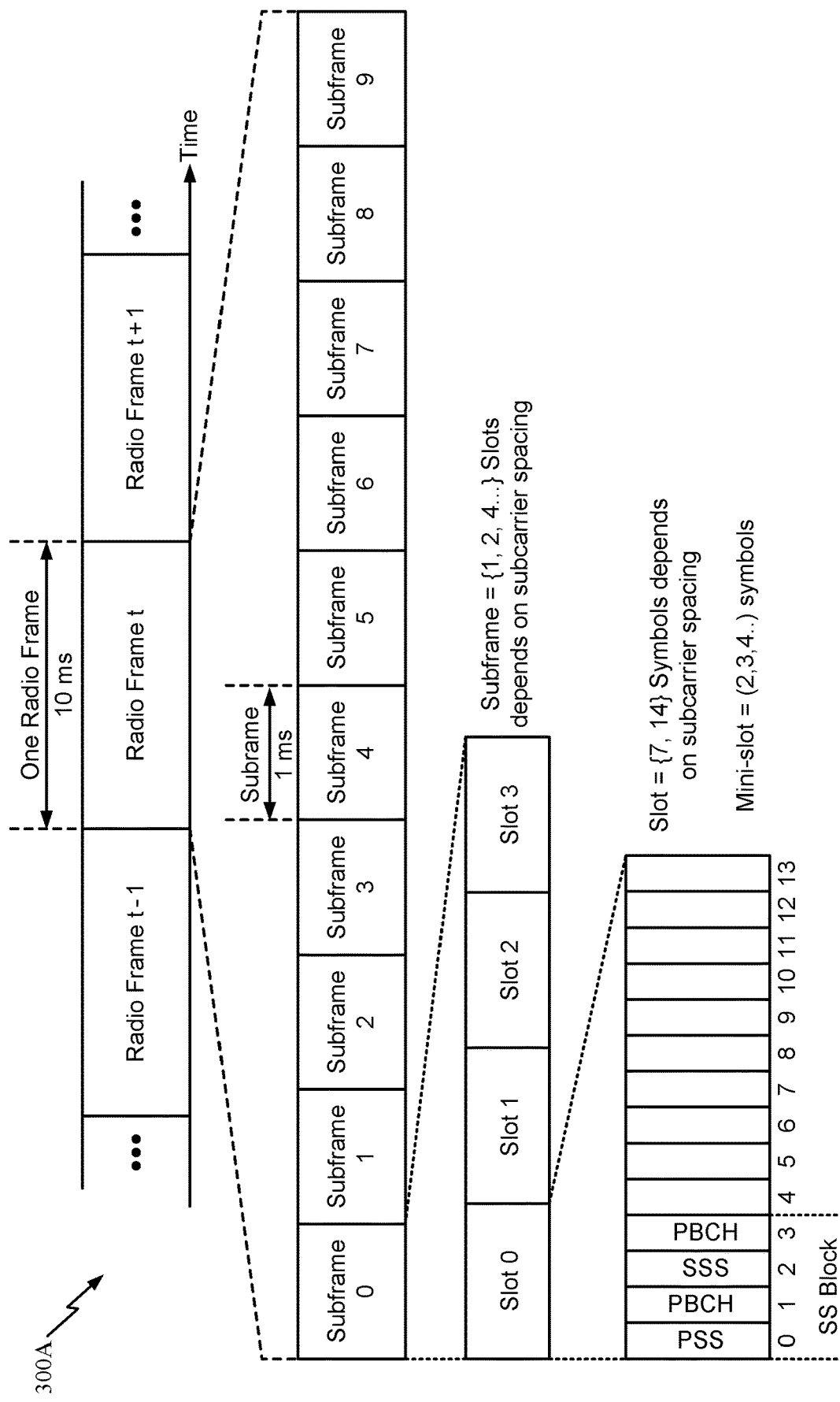
FIG. 3A illustrates an example of a frame format for a telecommunication system, in accordance with certain aspects of the present disclosure.

FIG. 3A is a diagram showing an example of a frame format 300A for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on the subcarrier spacing (SCS). Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 3A. The PSS and SSS may be used by UEs for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmW. The up to sixty-four transmissions of the SBB are referred to as the SS burst set. SSBs in an SS burst set are transmitted in the same frequency region, while SSBs in different SS bursts sets can be transmitted at different frequency locations.

Figure 3B:
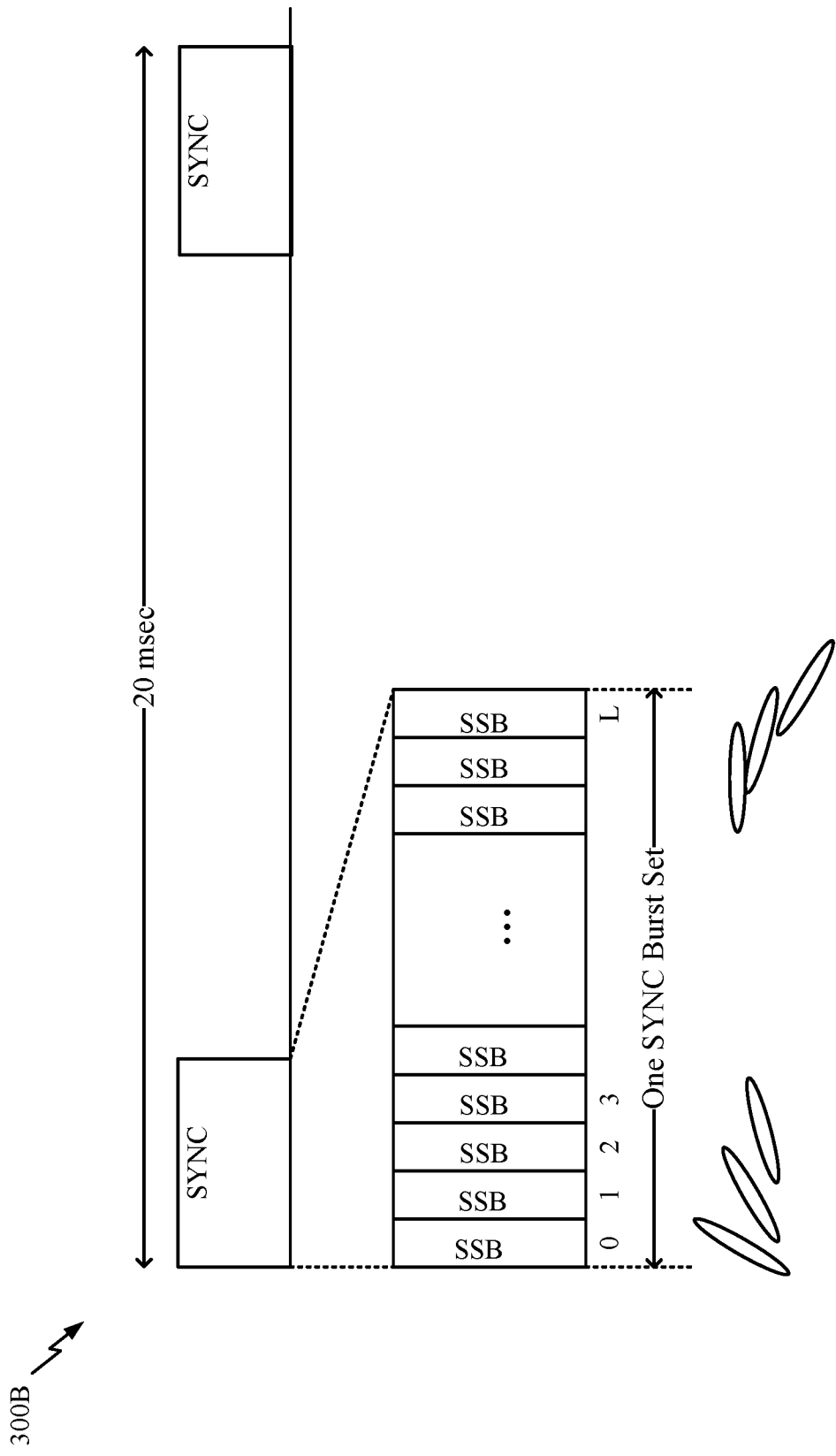
FIG. 3B illustrates how different synchronization signal blocks (SSBs) may be sent using different beams, in accordance with certain aspects of the present disclosure.

FIG. 3B illustrates an example 300B of how different SSBs may be sent using different beams, in accordance with certain aspects of the present disclosure. As shown in FIG. 3B, the SSBs may be organized into SS burst sets to support beam sweeping. As shown, each SSB within a burst set may be transmitted using a different beam, which may help a UE quickly acquire both TX and receive (RX) beams (particular for mmW applications). A physical cell identity (PCI) may still be decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit NR PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other BS may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Layer 1 (L1)/Layer 2 (L2) Mobility

Aspects of the present disclosure relate to wireless communications, and more particularly, to mobility techniques that allow for dynamically updating a set of cells and/or beams activated to serve a user equipment (UE). As will be described in greater detail below, the set of activated cells may be updated based on physical (PHY) layer (Layer 1 (L1)) or medium access control (MAC) layer (Layer 2 (L2)) signaling that indicates one or more cells and/or beams to activate and/or de-activate.

The techniques presented herein may be applied in various bands utilized for New Radio (NR). For example, for the higher band referred to as frequency range 4 (FR4) (e.g., 52.6 gigahertz (GHz)—114.25 GHz), an orthogonal frequency division multiplexed (OFDM) waveform with very large subcarrier spacing (SCS) (960 kilohertz (kHz)—3.84 megahertz (MHz)) is required to combat severe phase noise. Due to the large SCS, the slot length tends to be very short.

In a lower band referred to as FR2 (24.25 GHz to 52.6 GHz) with 120 kHz SCS, the slot length is 125 μSec, while in FR4 with 960 kHz, the slot length is 15.6 μSec.

In multi-beam operation (e.g., involving FR1 and FR2 bands), more efficient uplink (UL)/downlink (DL) beam management may allow for increased intra-cell and inter-cell mobility (e.g., L1 and/or L2-centric mobility) and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of physical layer (PHY, Layer1, or L1) or medium access control (MAC, Layer2 or L2) signaling, as opposed to higher layer (e.g., radio resource control (RRC)) signaling.

Figure 4:
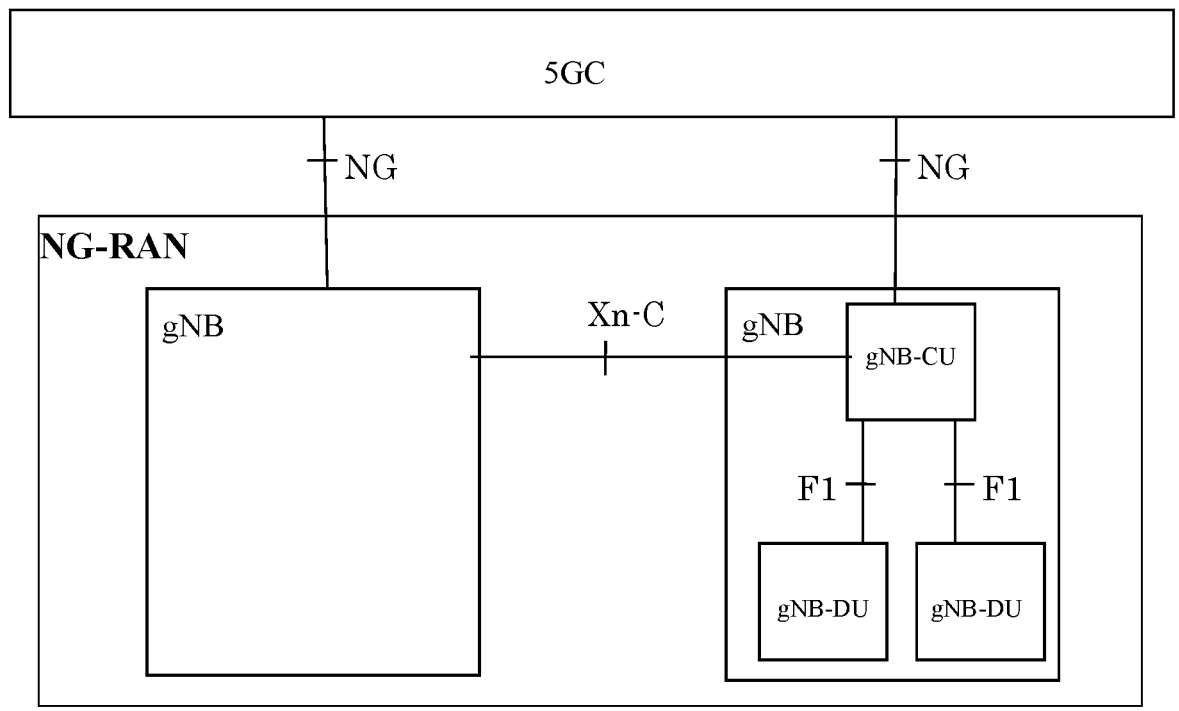
FIG. 4 illustrates an example architecture in which certain aspects of the present disclosure may be practiced.

FIG. 4 illustrates an example architecture 400 in which certain aspects of the present disclosure may be practiced. As illustrated, the architecture includes a next generation Node B (gNB) Central Unit (gNB-CU). The gNB-CU generally serves as a logical node hosting RRC, Service Data Adaptation Protocol (SDAP), and packet data convergence protocol (PDCP) protocols of the gNB that controls the operation of one or more gNB distributed units (gNB-DUs). As illustrated, the gNB-CU terminates an F1 interface connected with the gNB-DU.

Figure 5:
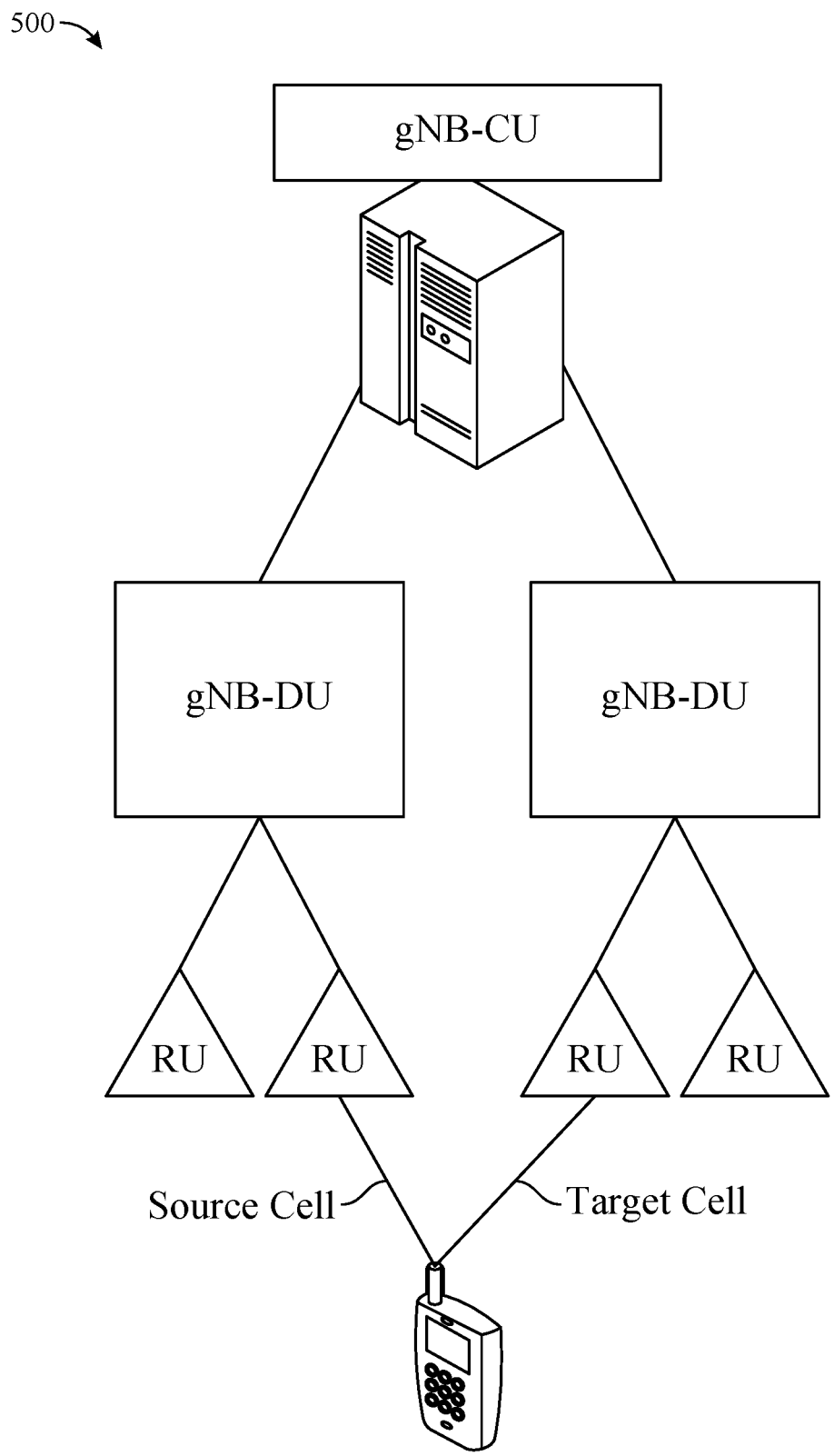
FIGS. 5 and 6 illustrate example scenarios in which certain aspects of the present disclosure may be practiced.
Figure 6:
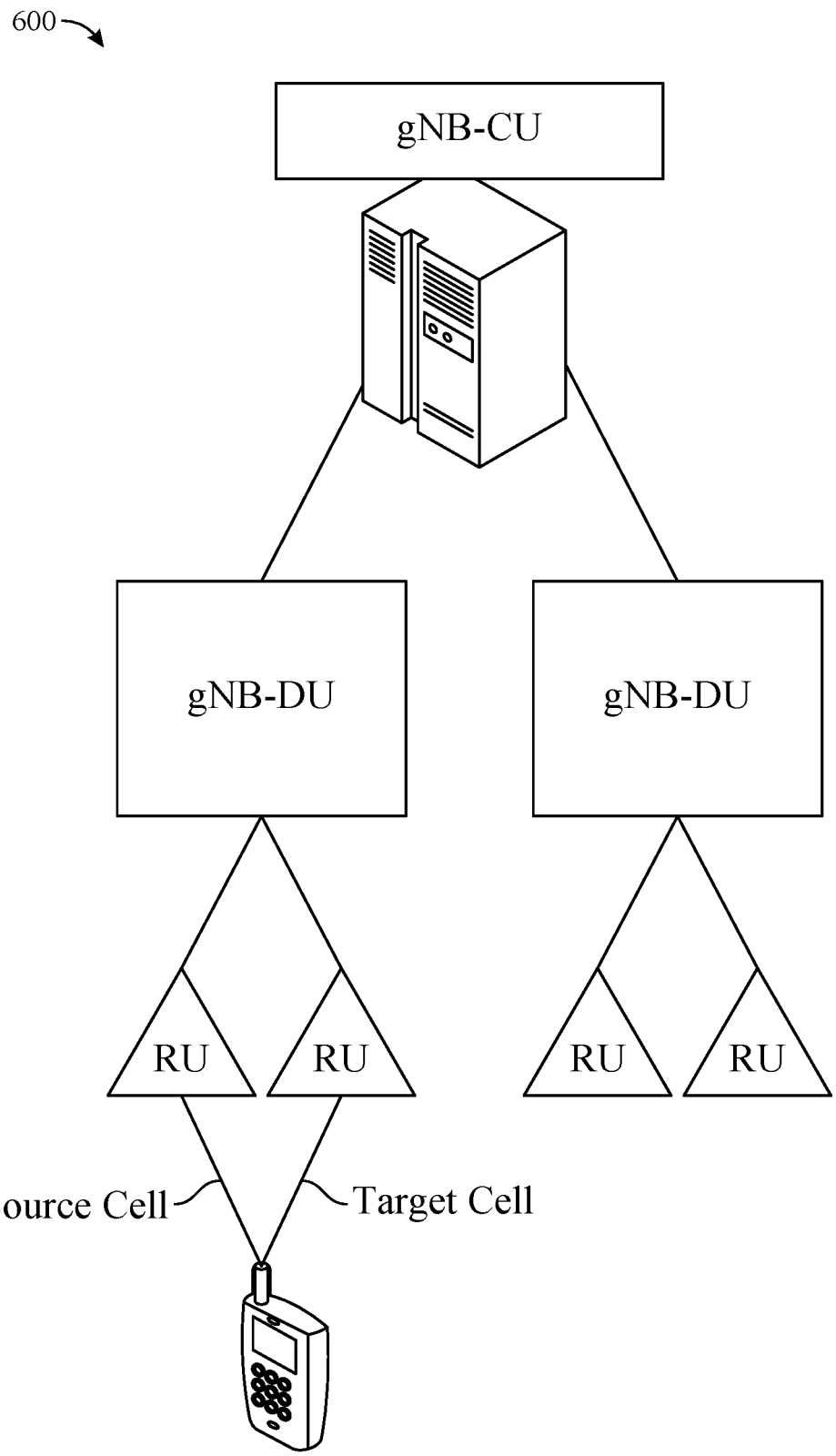

A gNB-DU generally serves as a logical node hosting radio link control (RLC), MAC, and PHY layers of the gNB, and its operation is controlled by gNB-CU. As illustrated in FIGS. 5 and 6, one gNB-DU supports one or multiple cells (but each cell is supported by only one gNB-DU). The gNB-DU terminates the F1 interface connected with the gNB-CU.

FIGS. 5 and 6 illustrate example scenarios 500 and 600, respectively, in which certain aspects of the present disclosure may be practiced. As illustrated in FIG. 5, in some cases, a UE may be transferred (e.g., handed over) between (source and target) cells supported by (radio units (RUs) of) different DUs under the same (e.g., common) CU. The RUs generally contain only PHY layer logic. In the scenario of FIG. 5, the cells may have non-collocated (in different DUs) PHY, MAC, and RLC logic, but common PDCP and RRC logic (the same CU). While L1/L2 signaling techniques described herein may be used for mobility, the data path from PDCP to different RLCs present some control aspects that may be addressed by coordination between DUs.

In the scenario illustrated in FIG. 6, on the other hand, source and target cells are supported by (belong to) the same DU. Thus, L1/L2 mobility may be particularly attractive in this scenario, as the cells can share MAC and upper layers (same DU). In this scenario, when moving a UE (e.g., in some cases, performing a handover) via L1/L2 signaling, the data path at MAC and above stays the same.

As noted above, the distributed RUs contain only PHY layer and may be used (activated/de-activated) in a similar manner to carrier aggregation (CA), but cells may be on the same carrier frequencies. As such, aspects of the present disclosure, however, may utilize mechanisms similar to those used in CA to enable L1/L2 mobility (e.g., activating/de-activating cells).

As an initial step, RRC signaling may be used to configure a set of cells for L1/L2 mobility. In general, the cell set may be designed to be large enough to cover meaningful mobility (e.g., anticipated mobility of a UE within a given area and given time). As will be described below, mobility management may be performed by activating/de-activating cells in the set.

From the configured set, at any given time, a certain set of cells may be activated. This set of activated cells generally refers to one or more cells in the configured set that are activated. If the set of activated cells includes two or more activated cells, the UE may be handed over from one activated cell to another activated cell via dynamic (PHY/MAC) signaling.

Which cells are activated for any given UE may depend on UE reported measurements. Configured cells that are not activated (a set of de-activated cells) may include the (remaining) group of cells in the configured set of cells that are de-activated (not activated).

Example Target Physical Cell Identifier (PCI) Selection

Aspects of the present disclosure provide apparatus, methods, processing systems, and computer readable mediums for enabling Layer 1 (L1)/Layer 2 (L2) inter-cell mobility based on signaling to/from a user equipment (UE). In some cases, L1/L2 signaling may be used to indicate a target physical cell identifier (PCI) (also referred to as a physical cell indicator) selected for handover (HO).

Some features may facilitate uplink (UL) beam selection for UEs equipped with multiple panels. For example, UL beam selection may be facilitated through UL beam indication based on a unified transmission configuration indicator (TCI) framework, enabling simultaneous transmission across multiple panels, and enabling fast panel selection. Further, UE-initiated or L1-event-driven beam management may also reduce latency and the probability that beam failure events occur.

Additional enhancements for multi-transmission reception point (TRP) deployment may target both frequency range 1 (FR1) and frequency range 2 (FR2) bands. These enhancements may improve reliability and robustness for channels other than the physical downlink shared channel (PDSCH) (e.g., physical downlink control channel (PDCCH), physical uplink shared channel (PUSCH), and physical uplink control channel (PUCCH)) using multi-TRP and/or multi-panel operations. These enhancements may, in some cases, be related to quasi co-location (QCL) and TCI that may enable inter-cell multi-TRP operations and may allow for simultaneous multi-TRP transmission with multi-panel reception, assuming multi-downlink control information (DCI)-based multi-PDSCH reception.

Still further enhancements may support single frequency networks (SFNs) in high speed environments (e.g., in the High Speed Train (HST) scenario). These may include QCL assumptions for demodulation reference signals (DMRSs), such as multiple QCL assumptions for the same DMRS ports and/or targeting downlink (DL)-only transmission. In some cases, the enhancements may specify a QCL or QCL-like relation, including applicable QCL types and associated requirements, between DL and UL signals by using a unified TCI framework.

In $3^{rd}$ Generation Partnership Project (3GPP) Release 15 (Rel-15) and Release 16 (Rel-16), each serving cell may have a radio resource control (RRC)-configured serving cell identifier (ID) and an RRC-configured PCI. A UE may also acquire the PCI from an synchronization signal block (SSB) of the serving cell.

To enable L1 (e.g., physical (PHY) layer)/L2 (e.g., medium access control (MAC) layer) based inter-cell mobility, a base station (BS), such as a next generation Node B (gNB), may need to know whether a UE supports L1/L2 based inter-cell mobility. L1/L2 based inter-cell mobility may include various operating modes. In a first operating mode, each serving cell may have a PCI and multiple physical cell sites (e.g., remote radio headers (RRHs)). Each RRH may transmit a different set of SSB IDs using the same PCI. A DCI or MAC-control element (MAC-CE) may select which RRH or corresponding SSB to serve the UE based on signal strength metrics (e.g., reference signal received power (RSRP)) per reported SSB ID.

In a second operating mode, each serving cell may be configured with multiple PCIs. Each RRH of the serving cell may use one of the multiple PCIs configured for the serving cell and transmit the full set of SSB IDs configured for the cell. A DCI or MAC-CE may select which RRH(s) or corresponding PCI(s) and/or SSB(s) to serve the UE based on signal strength metrics (e.g., RSRP) per reported SSB ID per reported PCI.

In a third operating mode, each serving cell may be configured with a single PCI. A DCI or MAC-CE may identify serving cell(s) or corresponding serving cell ID(s) to serve the UE based on signal strength metrics (e.g., RSRP) pre reported SSB ID per reported PCI.

While the above refers to selection or use of SSBs, it should be understood that other cell-identifying reference signals (RSs) may be used to identify a serving cell to serve a UE. For example, channel state information (CSI) reference signals (CSI-RSs) or positioning reference signals (PRSs) may be used to identify the serving cell(s) to serve the UE.

In some embodiments, in L1/L2 inter-cell mobility, a UE may be configured with multiple candidate cells (e.g., PCIs) for L1 metric measurement and reporting. L1 metric measurement and reporting may waste power in situations where a UE is stationary (or substantially stationary). A UE may continue to report L1 metrics while stationary, and it may take some time before a gNB determines, based on the reported L1 metrics, that the UE is stationary.

Example Random Access Channel (RACH) Based Inter-Cell Mobility

Aspects of the present disclosure provide apparatus, methods, processing systems, and computer readable mediums for enabling random access channel (RACH) based inter-cell mobility based on signaling by a user equipment (UE).

To reduce handover (HO) latency, conditional HO (CHO) was introduced (in $3^{rd}$ Generation Partnership Project (3GPP) Release 16 (Rel-16)). In CHO scenarios, multiple candidate target cells may be preconfigured by a base station (BS) (e.g., next generation Node B (gNB)), and a UE may select a target cell among the multiple candidate target cells if certain (configured/pre-configured) conditions are met.

The UE may then initiate a cell reconfiguration with synchronization when the preconfigured HO condition is satisfied for that particular target cell. The CHO may be completed after a UE transmits a message to the selected target cell indicating that reconfiguration is complete.

L1/L2 based inter-cell mobility may further reduce HO latency. As noted above, in a first implementation, each serving cell may have multiple physical cell identifiers (PCIs) for remote radio headers (RRHs), which may be at different physical (e.g., geographic) locations. A gNB may dynamically select a subset of PCIs of the same serving cell (e.g., same candidate target cell) to serve the UE via L1/L2 signaling (e.g., downlink control information (DCI) or medium access control (MAC) control element (CE) signaling). In a second implementation, each serving cell may have a single PCI (e.g., as defined in a specification of each serving cell). In this case, a gNB may dynamically select at least one serving cell to serve the UE via L1/L2 signaling.

Aspects of the present disclosure provide techniques that may help enhance HO procedures using L1/L2 inter-cell mobility signaling by introducing RACH. L1/L2 signaling may be used for HO signaling rather than radio resource control (RRC) signaling which typically has a higher associated latency than L1/L2 signaling. According to certain aspects described herein, the L1/L2 HO procedure may involve transmitting a random access signal on an uplink (UL) resource configured for a target PCI. In some embodiments, the RACH based L1/L2 mobility and legacy CHO may both be enabled to provide backup should the initially performed procedure fail (e.g., if a gNB fails to receive a HO complete message in a RACH based L1/L2 mobility procedure, the UE may subsequently initiate CHO given an HO condition is satisfied).

Figure 7:
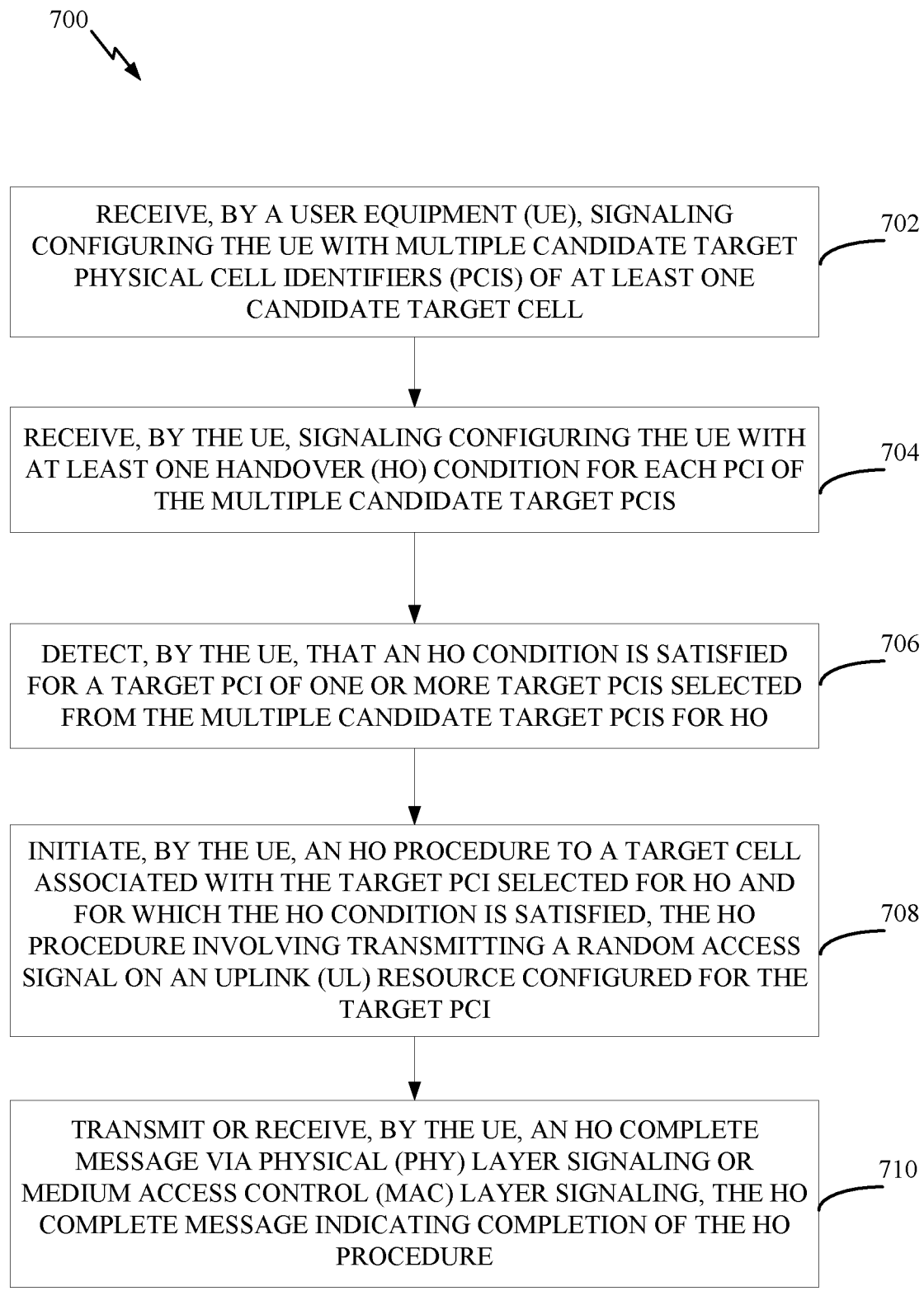
FIG. 7 is a flow diagram illustrating example operations for wireless communication by a UE, in accordance with certain aspects of the present disclosure.

FIG. 7 is a flow diagram illustrating example operations 700 for wireless communication that may be performed by a UE to initiate HO procedures in RACH-based mobility, in accordance with certain aspects of the present disclosure. Operations 700 may be performed, for example, by UE 120 illustrated in FIG. 1 and FIG. 2.

Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 begin, at block 702, by a UE receiving signaling configuring the UE with multiple candidate target PCIs of at least one candidate target cell. At block 704, the UE receives signaling configuring the UE with at least one HO condition for each PCI of the multiple candidate target PCIs. At block 706, the UE detects that an HO condition is satisfied for a target PCI of one or more target PCIs selected from the multiple candidate target PCIs for HO.

At block 708, the UE initiates an HO procedure to a target cell associated with the target PCI for which the HO condition is satisfied, the HO procedure involving transmitting a random access signal on a UL resource configured for the target PCI. At block 710, the UE transmits or receives and HO complete message, via physical (PHY) layer or MAC layer signaling, an HO complete message indicating completion of the HO procedure.

Figure 8:
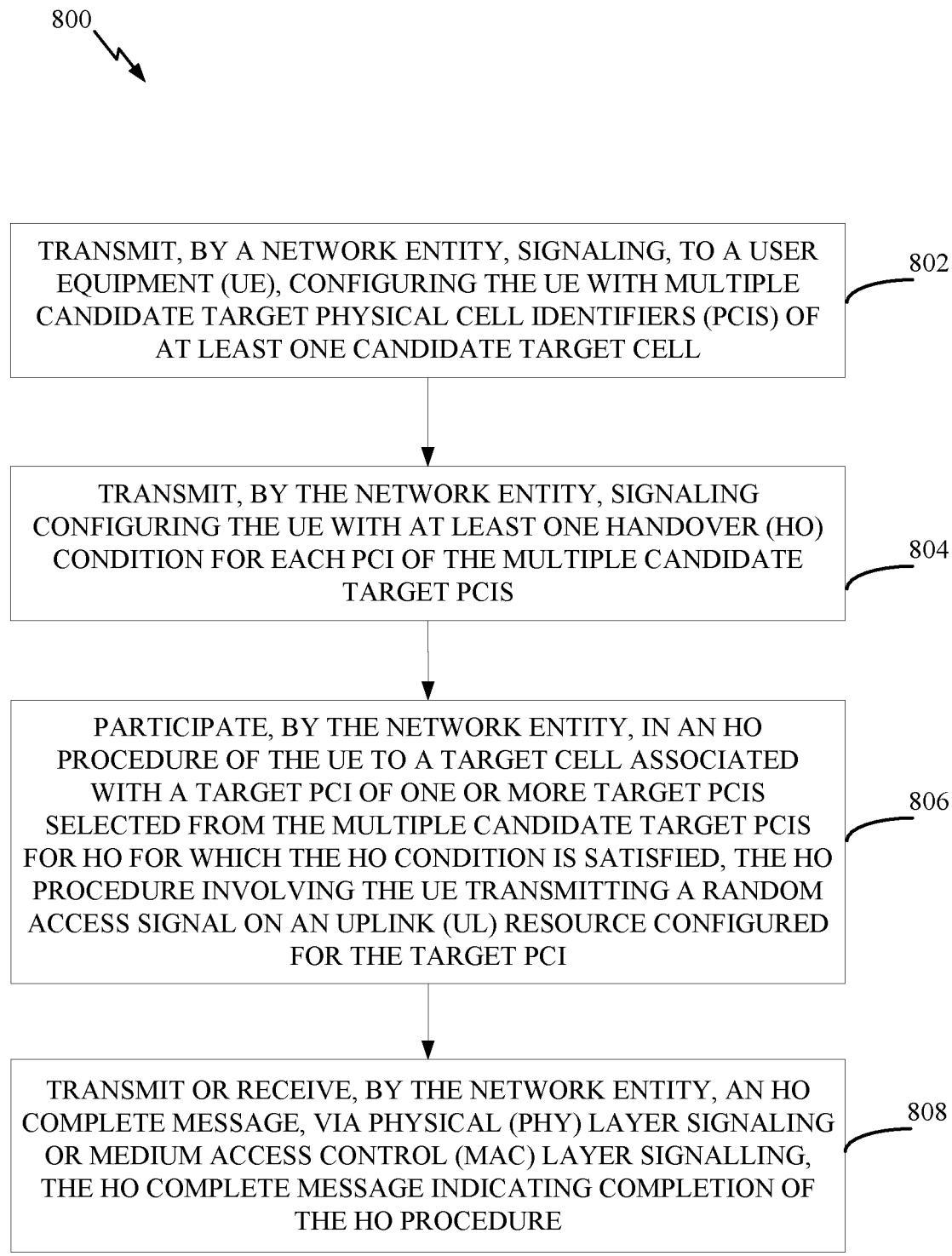
FIG. 8 is a flow diagram illustrating example operations for wireless communication by a network entity, in accordance with certain aspects of the present disclosure.

FIG. 8 is a flow diagram illustrating example operations 800 for wireless communication that may be performed by a network entity. For example, operations 800 may be performed by BS 110 of FIG. 1 or FIG. 2 or a gNB distributed unit (DU)/centralized unit (CU) of FIG. 5 or FIG. 6 to configure a UE (performing operations 700 of FIG. 7) for L1/L2 based CHO with RACH.

Operations 800 may be implemented as software components that are executed and run on one or more processors (e.g., controller/processor 240 of FIG. 2). Further, the transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 800 begin, at block 802, by transmitting signaling, to a UE, configuring the UE with multiple candidate target PCIs of at least one candidate target cell. At block 804, the network entity transmits signaling configuring the UE with at least one HO condition for each PCI of the multiple candidate target PCIs.

At block 806, the network entity participates in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI. At block 808, the network entity transmits or receives and HO complete message, via PHY layer or MAC layer signaling, the HO complete message indicating completion of the HO procedure.

RACH based L1/L2 inter-cell mobility may be implemented during CHO procedures. In certain aspects, multiple candidate target PCIs may be preconfigured to the UE by a gNB. In some examples, the candidate target PCIs may be selected by the gNB based on a measurement report (e.g., the UE's Layer 3 (L3) cell reference signal received power (RSRP)). In some cases, the multiple candidate target PCIs may belong to a same serving cell. In some cases, the multiple candidate target PCIs may belong to multiple serving cells.

In some cases, the gNB may also configure the UE to measure at least one PHY layer (L1) metric per candidate target PCI. For example, the PHY layer (L1) metric to be measured per candidate target PCI may include an L1-RSRP and/or an L1 signal-to-interference-plus-noise-ratio (L1-SINR).

The gNB may also configure one or more HO conditions per candidate target PCI. In some cases, each of the one or more HO conditions per candidate target PCI may involve the measured PHY layer (L1) metric as an input. In other words, a HO condition may be based on the measured PHY layer (L1) metric.

In certain aspects, whenever the HO condition is satisfied for a candidate target PCI, the UE may initiate reconfiguration to the target cell associated with that candidate target PCI. In such cases, the UE may initiate the reconfiguration with synchronization (e.g., via RACH) on UL resources configured for that candidate target PCI.

In some cases, completion of the RACH based L1/L2 CHO may be indicated via a HO complete message signaled via L1/L2 signaling. As will be described in greater detail below, this HO complete message may be sent from the UE to the RRH and/or the target cell associated with the candidate target PCI. Alternatively, the HO complete message may be received by the UE.

The HO complete message in L1/L2 signaling may be implemented in various ways. As an example, HO complete message may be implemented in different ways for scenarios where the RACH procedure is based on contention free random access (CFRA) than scenarios where the RACH procedure is based on contention based random access (CBRA). In CBRA, the UE randomly selects an RA preamble from a pool of preambles shared with others UEs while in CFRA, the UE uses a dedicated preamble provided by the network specific for this UE to use. For example, if the RACH procedure (performed for the target candidate cell that satisfied the CHO condition) is based on CFRA, after receiving the preamble, the RRH/cell associated with the selected candidate target PCI may send the UE the HO complete message. In this case, the HO complete message may be sent via a DCI scrambled with a cell radio network temporary identifier (C-RNTI) assigned to the UE for this selected candidate target PCI.

As another example, if the RACH is based on CBRA, after transmitting the preamble, the UE may send the HO complete message to the RRH/cell associated with the selected target PCI. In this case, the HO complete message may be contained in uplink control information (UCI) and/or MAC-CE carried by a physical uplink control channel (PUCCH) and/or physical uplink shared channel (PUSCH). The HO complete message may also contain the C-RNTI assigned to the UE for the selected candidate target PCI.

In some cases, after receiving the HO complete message, the gNB may further provide the UE with acknowledgement (ACK) and/or negative acknowledgement (NACK) information, which can be carried in DCI and/or MAC-CE. The ACK/NACK information may provide feedback to the UE letting the UE know whether the HO complete message was received by the gNB.

In some aspects, regardless of whether the RACH is performed via CFRA or CBRA, rather than transmit a conventional RACH preamble, other UL reference signals (RSs), such as a sounding RS (SRS), may be transmitted.

In certain aspects, the RACH based L1/L2 mobility procedure and legacy CHO procedure (each procedure referred to as a "feature") may interact in various ways depending on a particular implementation or deployment. For example, in some cases, it may not be permissible to have both RACH based L1/L2 mobility and legacy CHO enabled at the same time. Other implementations or deployments, however, may allow for both features to be enabled simultaneously. In this case, the HO may be triggered independently on a per feature basis whenever the corresponding (L1/L2) HO condition is satisfied.

Additionally or alternatively, one feature may be prioritized over the other feature. In such cases, when an HO according to the prioritized feature fails, HO may be attempted based on the other feature. For example, when RACH based L1/L2 HO fails due to not receiving an HO complete message from a gNB, the UE may further check if the CHO based HO condition is satisfied. If the HO condition is satisfied, the UE may initiate the CHO based HO.

In some cases, the RNTI for a particular PCI or set of PCIS may depend on a particular usage for the RNTI, described in more detail with respect to FIG. 11.

Figure 9:
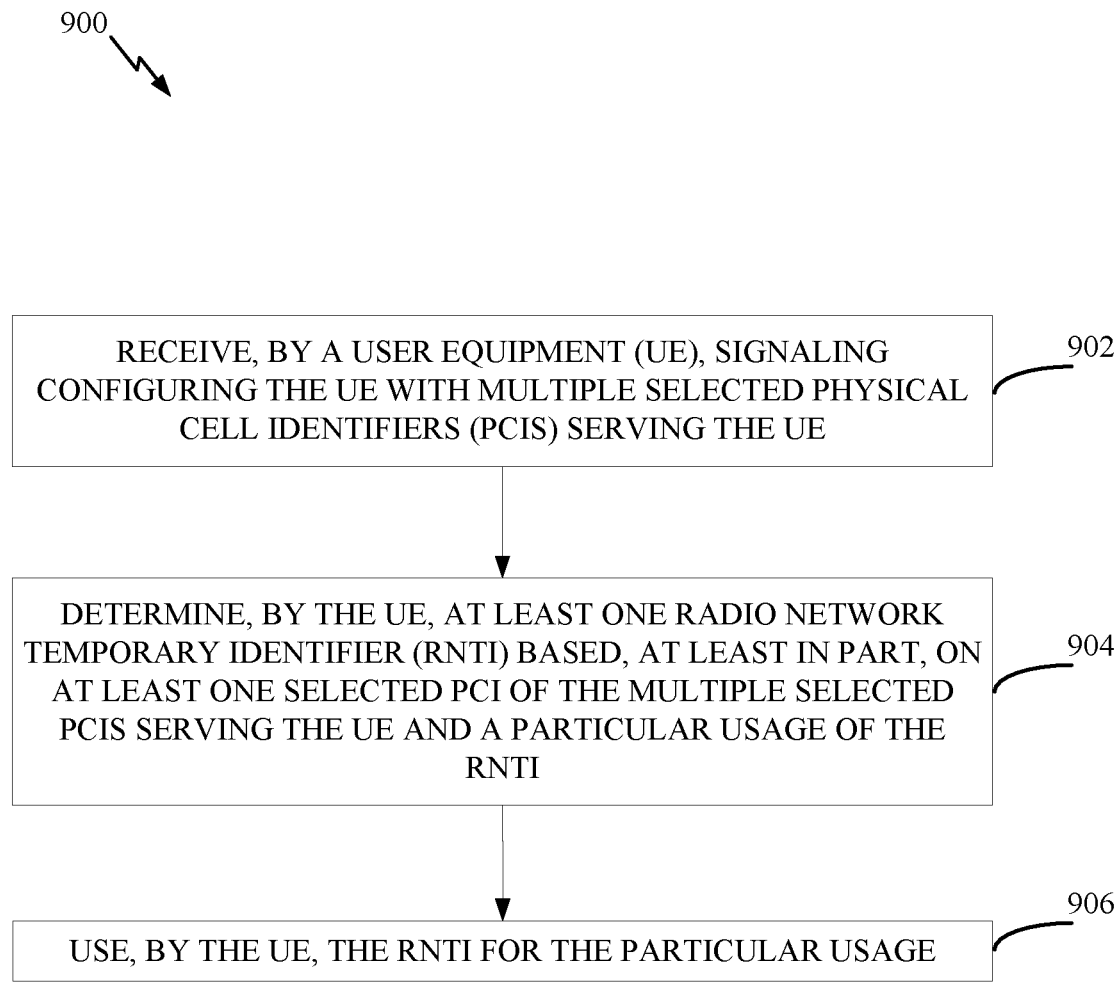
FIG. 9 is a flow diagram illustrating example operations for wireless communication by a UE, in accordance with certain aspects of the present disclosure.

FIG. 9 is a flow diagram illustrating example operations 900 for wireless communication that may be performed by a UE to determine an RNTI and a corresponding use, in accordance with certain aspects of the present disclosure. Operations 900 may be performed, for example, by UE 120 illustrated in FIG. 1 and FIG. 2.

Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 900 begin, at block 902, by a UE receiving signaling configuring the UE with multiple selected PCIs per serving cell serving the UE. At block 904, the UE determines at least one RNTI based, at least in part, on at least one selected PCI of the multiple selected PCIs serving the UE and a particular usage of the RNTI. At 906, the UE uses the RNTI for the particular usage.

Figure 10:
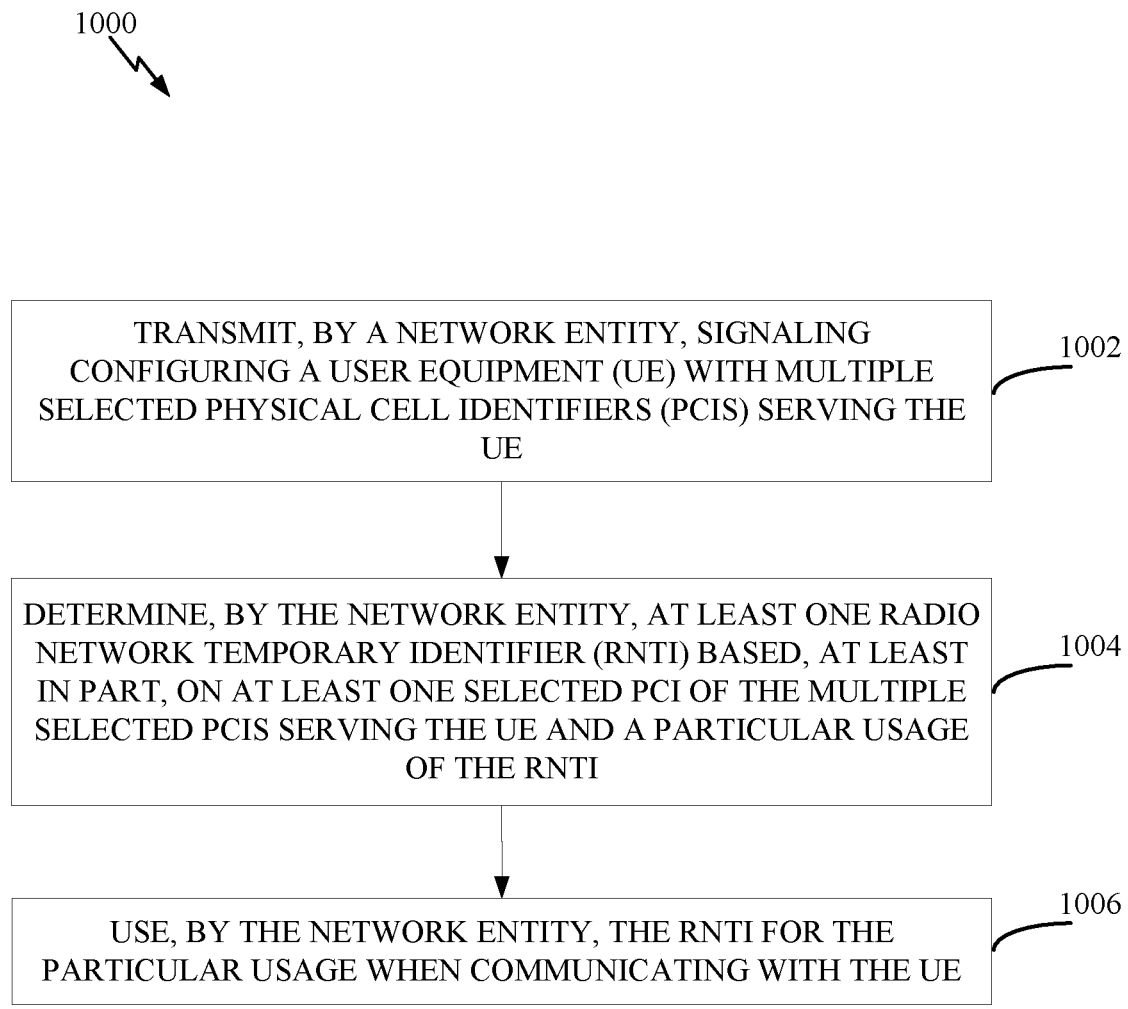
FIG. 10 is a flow diagram illustrating example operations for wireless communication by a network entity, in accordance with certain aspects of the present disclosure.

FIG. 10 is a flow diagram illustrating example operations 1000 that may for wireless communication that may be performed by a network entity for configuring a UE with different RNTI values for different PCIs, in accordance with certain aspects of the present disclosure. For example, operations 1000 may be performed by a BS 110 of FIG. 1 or FIG. 2 or a gNB DU/CU. Operations 1000 may be complementary to operations 900 performed by a UE.

Operations 1000 may be implemented as software components that are executed and run on one or more processors (e.g., controller/processor 240 of FIG. 2). Further, the transmission and reception of signals by the network entity in operations 1000 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 1000 begin, at block 1002, by a network entity transmitting signaling configuring a UE with multiple selected PCIs per serving cell serving the UE. At block 1004, the network entity determines at least one RNTI based, at least in part, on at least one selected PCI of the multiple selected PCIs serving the UE and a particular usage of the RNTI. At block 1006, the network entity uses the RNTI for the particular usage when communicating with the UE.

In the case of multiple PCIs per serving cell for L1/L2 inter-cell mobility, a determination of an RNTI may have various implementations. In certain aspects, the RNTI for a particular usage may be the same RNTI for the same serving cell, regardless of which PCI(s) is/are selected to serve the UE. Additionally or alternatively, the RNTI for a particular usage may be a different RNTI when different PCI(s) are selected to serve the UE. In this case, the RNTI for a particular usage may be configured to be different for different PCIs. Furthermore, the RNTI for a particular usage may be dynamically signaled by the gNB, for example, when PCI(s) serving the UE is/are updated.

FIG. 11 illustrates a table 1100 of example identifiers with corresponding usages for wireless communication where different RNTIs may have different usages, in accordance with certain aspects of the present disclosure. For example, as illustrated in FIG. 11, a paging RNTI (P-RNTI) may correspond to a "paging and system information change notification" usage while a system information RNTI (SI-RNTI) may correspond to a "broadcast of system information" usage. Moreover, any of the RNTIs and their corresponding usage depicted in FIG. 11 may be implemented in the RACH based L1/L2 inter cell mobility described herein.

Other RNTIs and their corresponding usages depicted in FIG. 11 include a random access RNTI (RA-RNTI), MSGB-RNTI, temporary cell RNTI (Temporary C-RNTI), modulation and coding scheme (MCS) C-RNTI (MCS-C-RNTI), configured scheduling (CS) RNTI (CS-RNTI), transmit power control (TPC) PUCCH RNTI (TPC-PUCCH-RNTI), TPC-SRS-RNTI, interruption (INT) RNTI (INT-RNTI), slot format indicator (SFI) RNTI (SFI-RNTI), semi-persistent (SP) channel state information (CSI) RNTI (SP-CSI-RNTI), cancellation indication (CI) RNTI (CI-RNTI), and power saving (PS) RNTI (PS-RNTI). While FIG. 11 illustrates example RNTIs and their corresponding usages, other RNTIs and their corresponding usages not listed in FIG. 11 may be considered.

Example Wireless Communication Devices

Figure 12:
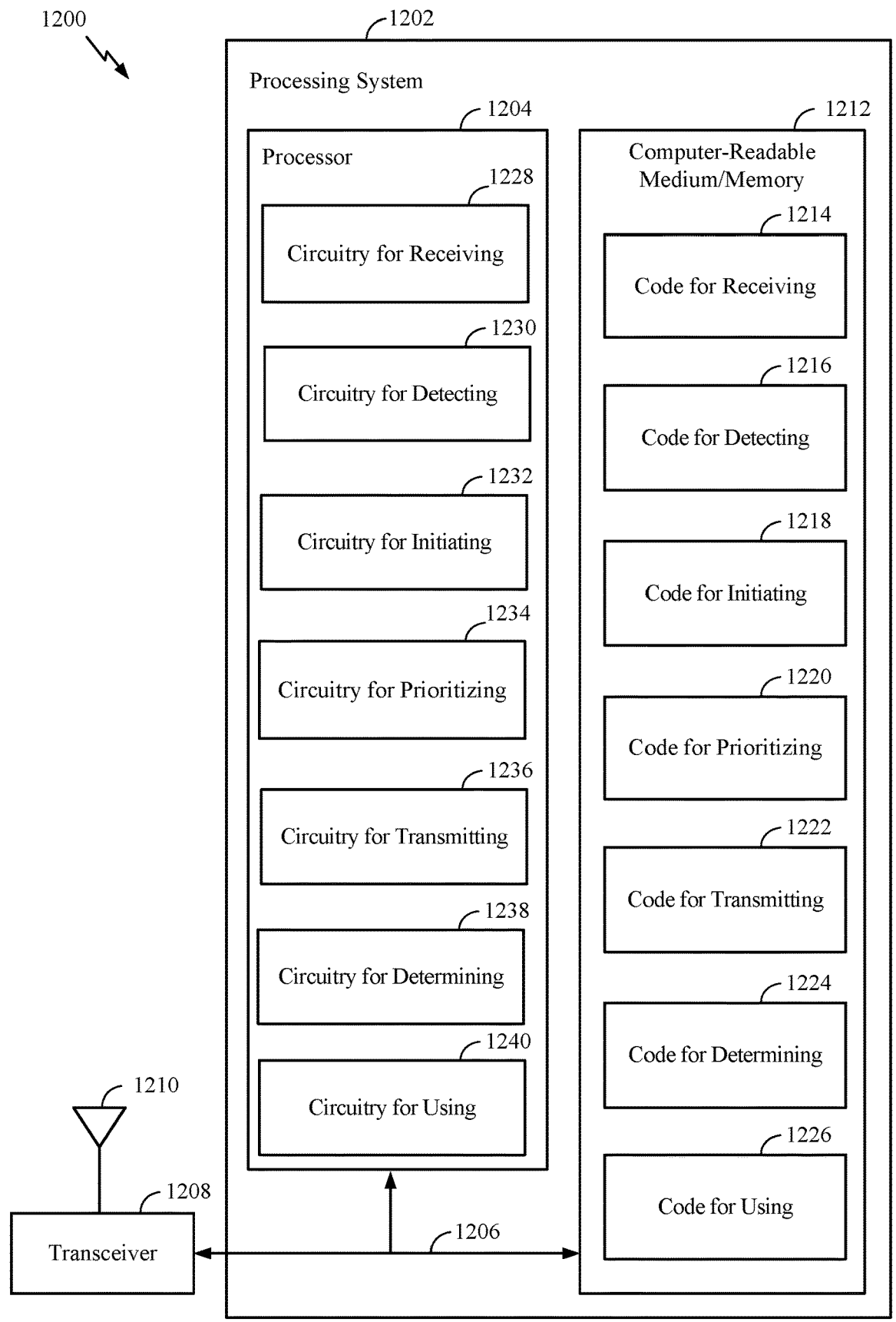
FIG. 12 illustrates an example wireless communications device configured to perform operations for the methods disclosed herein, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 7 and FIG. 9.

Communications device 1200 includes a processing system 1202 coupled to a transceiver 1208 (e.g., a transmitter and/or a receiver). Transceiver 1208 is configured to transmit and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 7, FIG. 9, or other operations for performing the various techniques discussed herein for random access channel (RACH) based inter-cell mobility (e.g., handover (HO)). In some cases, the processor 1204 can include one or more components of UE 120 with reference to FIG. 2 such as, for example, controller/processor 280 (including the Layer 1 (L1)/Layer 2 (L2) mobility module 122), transmit processor 264, receive processor 258, and/or the like. Additionally, in some cases, the computer-readable medium/memory 1212 can include one or more components of UE 120 with reference to FIG. 2 such as, for example, memory 282 and/or the like.

In certain aspects, computer-readable medium/memory 1212 stores code 1214 for receiving, code 1216 for detecting, code 1218 for initiating, code 1220 for prioritizing, code 1222 for transmitting, code 1224 for determining, and code 1226 for using.

In some cases, code 1214 for receiving may include code for receiving signaling configuring the UE with multiple candidate target physical cell identifiers (PCIs) of at least one candidate target cell. In some cases, code 1214 for receiving may include code for receiving signaling configuring the UE with at least one HO condition for each PCI of the multiple candidate target PCIs. In some cases, code 1214 for receiving may include code for receiving an HO complete message via physical (PHY) layer signaling or medium access control (MAC) layer signaling, the HO complete message indicating completion of the HO procedure. In some cases, code 1214 for receiving may include code for receiving signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a reference signal received power (RSRP) or a signal to interference and noise ratio (SINR). In some cases, code 1214 for receiving may include code for receiving, from the target PCI, acknowledgment (ACK)/negative ACK (NACK) feedback for the HO complete message. In some cases, code 1214 for receiving may include code for receiving signaling enabling: use of a PHY or MAC layer HO procedure, use of a radio resource control (RRC) HO procedure, use of both the PHY or MAC layer HO procedure and the RRC HO procedure. In some cases, code 1214 for receiving may include code for receiving signaling configuring the UE with multiple selected PCIs per serving cell serving the UE.

In some cases, code 1216 for detecting may include code for detecting that an HO condition is satisfied for a target PCI of one or more target PCIs selected from the multiple candidate target PCIs for HO.

In some cases, code 1218 for initiating may include code for initiating an HO procedure to a target cell associated with the target PCI selected for HO and for which the HO condition is satisfied, the HO procedure involving transmitting a random access signal on an uplink (UL) resource configured for the target PCI.

In some cases, code 1220 for prioritizing may include code for prioritizing one of the PHY or MAC layer HO procedure or the RRC HO procedure when the UE receives signaling enabling use of both the PHY or MAC layer HO procedure and the RRC HO procedure.

In some cases, code 1222 for transmitting may include code for transmitting an HO complete message via PHY layer signaling or MAC layer signaling, the HO complete message indicating completion of the HO procedure.

In some cases, code 1224 for determining may include code for determining at least one radio network temporary identifier (RNTI) based, at least in part, on at least one selected PCI of the multiple selected PCIs serving the UE and a particular usage of the RNTI.

In some cases, code 1226 for using may include code for using the non-prioritized one of the PHY or MAC layer HO procedure or the RRC HO procedure when the prioritized one of the PHY or MAC layer HO procedure or the RRC HO procedure fails. In some cases, code 1226 for using may include code for using the RNTI for the particular usage.

In certain aspects, processor 1204 has circuitry configured to implement the code stored in the computer-readable medium/memory 1212. For example, processor 1204 includes circuitry 1228 for receiving, circuitry 1230 for detecting, circuitry 1232 for initiating, circuitry 1234 for prioritizing, circuitry 1236 for transmitting, circuitry 1238 for determining, and circuitry 1240 for using.

In some cases, circuitry 1228 for receiving may include circuitry for receiving signaling configuring the UE with multiple candidate target physical cell identifiers (PCIs) of at least one candidate target cell. In some cases, circuitry 1228 for receiving may include circuitry for receiving signaling configuring the UE with at least one HO condition for each PCI of the multiple candidate target PCIs. In some cases, circuitry 1228 for receiving may include circuitry for receiving an HO complete message via PH) layer signaling or MA) layer signaling, the HO complete message indicating completion of the HO procedure. In some cases, circuitry 1228 for receiving may include circuitry for receiving signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a RSR) or a SIN). In some cases, circuitry 1228 for receiving may include circuitry for receiving, from the target PCI, ACK/NACK feedback for the HO complete message. In some cases, circuitry 1228 for receiving may include circuitry for receiving signaling enabling: use of a PHY or MAC layer HO procedure, use of an RRC HO procedure, use of both the PHY or MAC layer HO procedure and the RRC HO procedure. In some cases, circuitry 1228 for receiving may include circuitry for receiving signaling configuring the UE with multiple selected PCIs per serving cell serving the UE.

In some cases, circuitry 1230 for detecting may include circuitry for detecting that an HO condition is satisfied for a target PCI of one or more target PCIs selected from the multiple candidate target PCIs for HO.

In some cases, circuitry 1232 for initiating may include circuitry for initiating an HO procedure to a target cell associated with the target PCI selected for HO and for which the HO condition is satisfied, the HO procedure involving transmitting a random access signal on a UL resource configured for the target PCI.

In some cases, circuitry 1234 for prioritizing may include circuitry for prioritizing one of the PHY or MAC layer HO procedure or the RRC HO procedure when the UE receives signaling enabling use of both the PHY or MAC layer HO procedure and the RRC HO procedure.

In some cases, circuitry 1236 for transmitting may include circuitry for transmitting an HO complete message via PHY layer signaling or MAC layer signaling, the HO complete message indicating completion of the HO procedure.

In some cases, circuitry 1238 for determining may include circuitry for determining at least one radio network temporary identifier (RNTI) based, at least in part, on at least one selected PCI of the multiple selected PCIs serving the UE and a particular usage of the RNTI.

In some cases, circuitry 1240 for using may include circuitry for using the non-prioritized one of the PHY or MAC layer HO procedure or the RRC HO procedure when the prioritized one of the PHY or MAC layer HO procedure or the RRC HO procedure fails. In some cases, circuitry 1240 for using may include circuitry for using the RNTI for the particular usage.

In some cases, the operations illustrated in FIG. 5 and FIG. 7, as well as other operations described herein for RACH based inter-cell mobility (e.g., HO), may be implemented by one or means-plus-function components. For example, in some cases, such operations may be implemented by means for receiving (or means for obtaining), means for detecting, means for initiating, means for prioritizing, means for transmitting (or means for outputting for transmission), means for determining, and means for using.

In some cases, means for transmitting (or means for outputting for transmission) includes a transmitter (such as the transmit processor 264) and/or antenna(s) 252 of the UE 120 illustrated in FIG. 2 and/or circuitry 1236 for transmitting of the communication device 1200 in FIG. 12.

In some cases, means for receiving (or means for obtaining) includes a receiver (such as the receive processor 258) and/or antenna(s) 252 of the UE 120 illustrated in FIG. 2 and/or circuitry 1228 for receiving of the communication device 1200 in FIG. 12.

In some cases, means for detecting, means for initiating, means for prioritizing, means for determining, and means for using, includes a processing system, which may include one or more processors, such as the receive processor 258, the transmit processor 264, the TX MIMO processor 266, and/or the controller/processor 280 of the UE 120 illustrated in FIG. 2 and/or the processing system 1202 of the communication device 1200 in FIG. 12.

Figure 13:
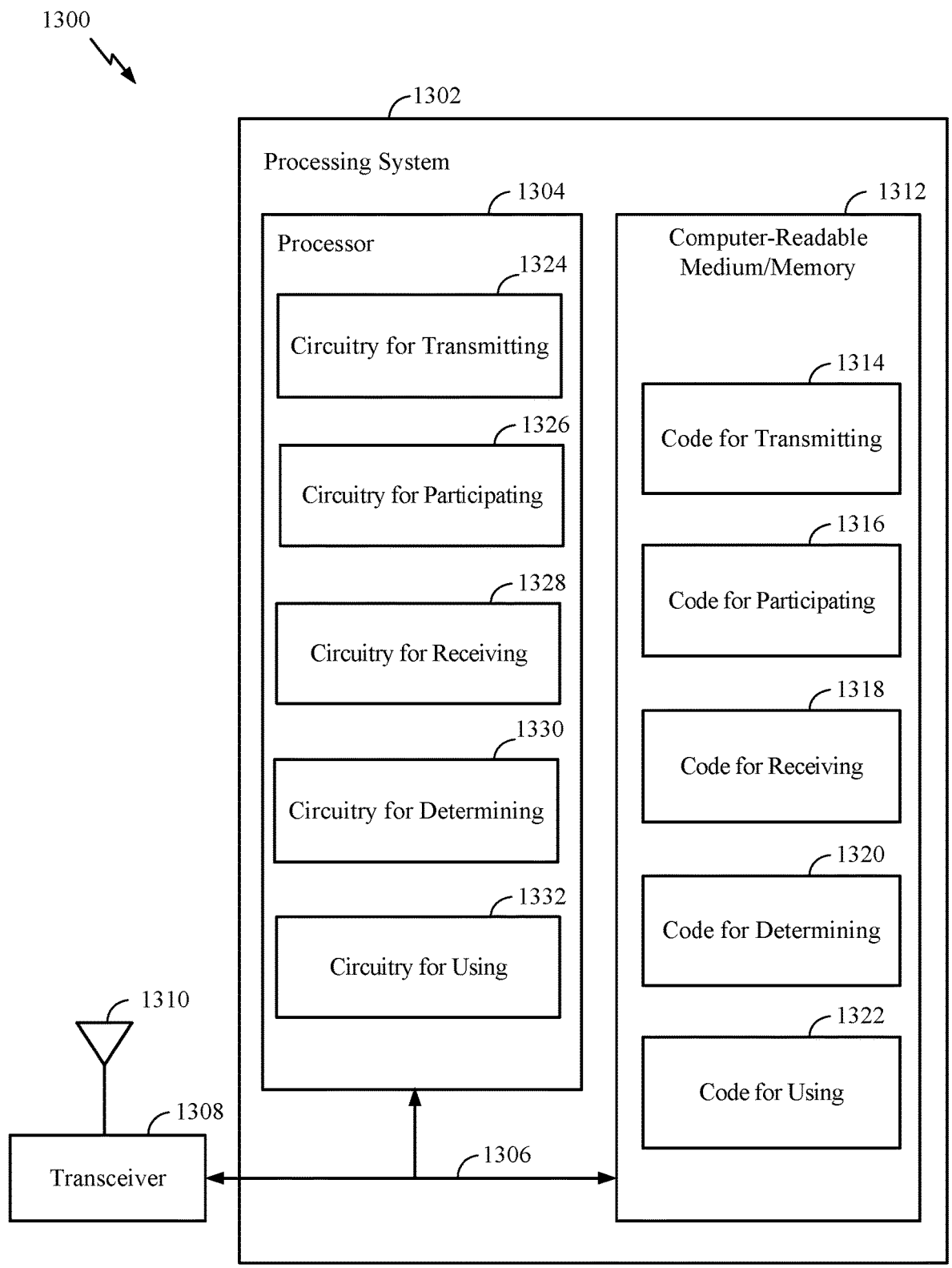
FIG. 13 illustrates an example wireless communications device configured to perform operations for the methods disclosed herein, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 8 and FIG. 10.

Communications device 1300 includes a processing system 1302 coupled to a transceiver 1308 (e.g., a transmitter and/or a receiver). Transceiver 1308 is configured to transmit and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations illustrated in FIG. 8 and FIG. 10, or other operations for performing the various techniques discussed herein for RACH based inter-cell mobility. In some cases, the processor 1304 can include one or more components of BS 110 with reference to FIG. 2 such as, for example, controller/processor 240 (including the L1/L2 mobility module 112), transmit processor 220, receive processor 238, and/or the like. Additionally, in some cases, the computer-readable medium/memory 1312 can include one or more components of BS 110 with reference to FIG. 2 such as, for example, memory 242 and/or the like.

In certain aspects, computer-readable medium/memory 1312 stores code 1314 for transmitting, code 1316 for participating, code 1318 for receiving, code 1320 for determining, and code 1322 for using.

In some cases, code 1314 for transmitting may include code for transmitting signaling, to a UE, configuring the UE with multiple candidate target PCIs of at least one candidate target cell. In some cases, code 1314 for transmitting may include code for transmitting signaling configuring the UE with at least one HO condition for each PCI of the multiple candidate target PCIs. In some cases, code 1314 for transmitting may include code for transmitting an HO complete message, via PHY layer signaling or MAC layer signaling, the HO complete message indicating completion of the HO procedure. In some cases, code 1314 for transmitting may include code for transmitting signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a RSRP or a SINR. In some cases, code 1314 for transmitting may include code for transmitting, via the target PCI, ACK/NACK feedback for the HO complete message. In some cases, code 1314 for transmitting may include code for transmitting signaling enabling: use of a PHY or MAC layer HO procedure, use of an RRC HO procedure, use of both the PHY or MAC layer HO procedure and the RRC HO procedure. In some cases, code 1314 for transmitting may include code for transmitting signaling configuring a UE with multiple selected PCIs per serving cell serving the UE.

In some cases, code 1316 for participating may include code for participating in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI.

In some cases, code 1318 for receiving may include code for receiving an HO complete message, via PHY layer signaling or MAC layer signaling, the HO complete message indicating completion of the HO procedure.

In some cases, code 1320 for determining may include code for determining at least one RNTI based, at least in part, on at least one selected PCI of the multiple selected PCIs serving the UE and a particular usage of the RNTI.

In some cases, code 1322 for using may include code for using the RNTI for the particular usage when communicating with the UE.

In certain aspects, processor 1304 has circuitry configured to implement the code stored in the computer-readable medium/memory 1312. For example, processor 1304 includes circuitry 1324 for transmitting, circuitry 1326 for participating, circuitry 1328 for receiving, circuitry 1330 for determining, and circuitry 1332 for using.

In some cases, circuitry 1324 for transmitting may include circuitry for transmitting signaling, to a UE, configuring the UE with multiple candidate target PCIs of at least one candidate target cell. In some cases, circuitry 1324 for transmitting may include circuitry for transmitting signaling configuring the UE with at least one HO condition for each PCI of the multiple candidate target PCIs. In some cases, circuitry 1324 for transmitting may include circuitry for transmitting an HO complete message, via PHY layer signaling or MAC layer signaling, the HO complete message indicating completion of the HO procedure. In some cases, circuitry 1324 for transmitting may include circuitry for transmitting signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a RSRP or a SINR. In some cases, circuitry 1324 for transmitting may include circuitry for transmitting, via the target PCI, ACK/NACK feedback for the HO complete message. In some cases, circuitry 1324 for transmitting may include circuitry for transmitting signaling enabling: use of a PHY or MAC layer HO procedure, use of an RRC HO procedure, use of both the PHY or MAC layer HO procedure and the RRC HO procedure. In some cases, circuitry 1324 for transmitting may include circuitry for transmitting signaling configuring a UE with multiple selected PCIs per serving cell serving the UE.

In some cases, circuitry 1326 for participating may include circuitry for participating in an HO procedure of the UE to a target cell associated with a target PCI of one or more target PCIs selected from the multiple candidate target PCIs for HO for which the HO condition is satisfied, the HO procedure involving the UE transmitting a random access signal on a UL resource configured for the target PCI.

In some cases, circuitry 1328 for receiving may include circuitry for receiving an HO complete message, via PHY layer signaling or MAC layer signaling, the HO complete message indicating completion of the HO procedure.

In some cases, circuitry 1330 for determining may include circuitry for determining at least one RNTI based, at least in part, on at least one selected PCI of the multiple selected PCIs serving the UE and a particular usage of the RNTI.

In some cases, circuitry 1332 for using may include circuitry for using the RNTI for the particular usage when communicating with the UE.

In some cases, the operations illustrated in FIG. 8 and FIG. 10, as well as other operations described herein for RACH based inter-cell mobility (e.g., HO), may be implemented by one or means-plus-function components. For example, in some cases, such operations may be implemented by means for transmitting (or means for outputting for transmission), means for participating, means for receiving (or means for obtaining), means for determining, and means for using.

In some cases, means for transmitting (or means for outputting for transmission) includes a transmitter (such as the transmit processor 220) and/or an antenna(s) 234 or the BS 110 illustrated in FIG. 2 and/or circuitry 1326 for transmitting of the communication device 1300 in FIG. 13.

In some cases, means for receiving (or means for obtaining) includes a receiver (such as the receive processor 238) and/or an antenna(s) 234 of the BS 110 illustrated in FIG. 2 and/or circuitry 1332 for receiving of the communication device 1300 in FIG. 13.

In some cases, means for participating, means for determining, and means for using, includes a processing system, which may include one or more processors, such as the receive processor 238, the transmit processor 220, the TX MIMO processor 230, and/or the controller/processor 240 of the BS 110 illustrated in FIG. 2 and/or the processing system 1302 of the communication device 1300 in FIG. 13.

Example Clauses

Implementation examples are described in the following numbered clauses:

Clause 1: A method for wireless communications performed by a user equipment (UE), comprising: receiving signaling configuring the UE with multiple candidate target physical cell identifiers (PCIs) of at least one candidate target cell; receiving signaling configuring the UE with at least one handover (HO) condition for each PCI of the multiple candidate target PCIs; detecting that an HO condition is satisfied for a target PCI of one or more target PCIs selected from the multiple candidate target PCIs for HO; initiating an HO procedure to a target cell associated with the target PCI selected for HO and for which the HO condition is satisfied, the HO procedure involving transmitting a random access signal on an uplink (UL) resource configured for the target PCI; and transmitting or receiving an HO complete message via physical (PHY) layer signaling or medium access control (MAC) layer signaling, the HO complete message indicating completion of the HO procedure.

Clause 2: The method of Clause 1, wherein the HO complete message is conveyed via at least one of: a MAC control element (MAC-CE); a downlink control information (DCI); or an uplink control information (UCI).

Clause 3: The method of Clause 1 or 2, wherein the multiple candidate target PCIs belong to: a same candidate target cell; or multiple candidate target cells.

Clause 4: The method of any of Clauses 1-3, further comprising receiving signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a reference signal received power (RSRP) or a signal to interference and noise ratio (SINR).

Clause 5: The method of any of Clauses 1-4, wherein the random access signal comprises at least one of a random access channel (RACH) preamble or a UL reference signal (RS).

Clause 6: The method of any of Clauses 1-5, wherein: the random access signal is based on a contention-free random access (CFRA); and the UE receives the HO complete message from the target PCI.

Clause 7: The method of Clause 6, wherein the HO complete message is contained in a downlink control information (DCI) scrambled with a radio network temporary identifier (RNTI) assigned to the UE for the target PCI.

Clause 8: The method of any of Clauses 1-7, wherein: the random access signal is based on a contention-based random access (CBRA); and the UE transmits the HO complete message to the target PCI.

Clause 9: The method of Clause 8, wherein: the HO complete message is contained in an uplink control information (UCI) carried via a physical uplink control channel (PUCCH) or a MAC control element (MAC CE) carried via a physical uplink shared channel (PUSCH); and the HO complete message conveys a radio network temporary identifier (RNTI) assigned to the UE for the target PCI.

Clause 10: The method of Clause 8 or 9, further comprising receiving, from the target PCI, acknowledgment (ACK)/negative ACK (NACK) feedback for the HO complete message.

Clause 11: The method of any of Clauses 1-10, further comprising receiving signaling enabling: use of a PHY or MAC layer HO procedure; use of a radio resource control (RRC) HO procedure; or use of both the PHY or MAC layer HO procedure and the RRC HO procedure.

Clause 12: The method of Clause 11, wherein when the UE receives signaling enabling use of both the PHY or MAC layer HO procedure and the RRC HO procedure, the PHY or MAC layer HO procedure and the RRC HO procedure are triggered independently when a corresponding layer 1 (L1) or layer 2 (L2) HO condition is satisfied.

Clause 13: The method of Clause 11 or 12, wherein when the UE receives signaling enabling use of both the PHY or MAC layer HO procedure and the RRC HO procedure: the UE prioritizes one of the PHY or MAC layer HO procedure or the RRC HO procedure; and the UE uses the non-prioritized one of the PHY or MAC layer HO procedure or the RRC HO procedure when the prioritized one of the PHY or MAC layer HO procedure or the RRC HO procedure fails.

Clause 14: A method for wireless communications performed by a network entity, comprising: transmitting signaling, to a user equipment (UE), configuring the UE with multiple candidate target physical cell identifiers (PCIs) of at least one candidate target cell; transmitting signaling configuring the UE with at least one handover (HO) condition for each PCI of the multiple candidate target PCIs; participating in an HO procedure of the UE to a target cell associated with a target PCI of one or more target PCIs selected from the multiple candidate target PCIs for HO for which the HO condition is satisfied, the HO procedure involving the UE transmitting a random access signal on an uplink (UL) resource configured for the target PCI; and transmitting or receiving an HO complete message, via physical (PHY) layer signaling or medium access control (MAC) layer signaling, the HO complete message indicating completion of the HO procedure.

Clause 15: The method of Clause 14, wherein the HO complete message is conveyed via at least one of: a MAC control element (MAC-CE); a downlink control information (DCI); or an uplink control information (UCI).

Clause 16: The method of Clause 14 or 15, wherein the multiple candidate target PCIs belong to: a same candidate target cell; or multiple candidate target cells.

Clause 17: The method of any of Clauses 14-16, further comprising transmitting signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a reference signal received power (RSRP) or a signal to interference and noise ratio (SINR).

Clause 18: The method of any of Clauses 14-17, wherein the random access signal comprises at least one of a random access channel (RACH) preamble or a UL reference signal (RS).

Clause 19: The method of any of Clauses 14-18, wherein: the random access signal is based on a contention-free random access (CFRA); and the network entity transmits, via the target PCI, the HO complete message.

Clause 20: The method of any of Clauses 14-19, wherein: the random access signal is based on a contention-based random access (CBRA); and the network entity receives, via the target PCI, the HO complete message.

Clause 21: The method of Clause 20, further comprising transmitting, via the target PCI, acknowledgment (ACK)/negative ACK (NACK) feedback for the HO complete message.

Clause 22: The method of any of Clauses 14-19, further comprising transmitting signaling enabling: use of a PHY or MAC layer HO procedure; use of a radio resource control (RRC) HO procedure; or use of both the PHY or MAC layer HO procedure and the RRC HO procedure.

Clause 23: The method of Clause 22, wherein when the network entity transmits signaling enabling use of both the PHY or MAC layer HO procedure and the RRC HO procedure, the PHY or MAC layer HO procedure and the RRC HO procedure are triggered independently when a corresponding layer 1 (L1) or layer 2 (L2) HO condition is satisfied.

Clause 24: The method of Clause 22 or 23, wherein when the network entity transmits signaling enabling use of both the PHY or MAC layer HO procedure and the RRC HO procedure, further comprising configuring the UE to: prioritize one of the PHY or MAC layer HO procedure or the RRC HO procedure; and use the non-prioritized one of the PHY or MAC layer HO procedure or the RRC HO procedure when the prioritized one of the PHY or MAC layer HO procedure or the RRC HO procedure fails.

Clause 25: A method for wireless communications performed by a user equipment (UE), comprising: receiving signaling configuring the UE with multiple selected physical cell identifiers (PCIs) per serving cell serving the UE; determining at least one radio network temporary identifier (RNTI) based, at least in part, on at least one selected PCI of the multiple selected PCIs serving the UE and a particular usage of the RNTI; and using the RNTI for the particular usage.

Clause 26: The method of Clause 25, wherein a same RNTI is determined for a particular usage, regardless of the at least one selected PCIs serving the UE.

Clause 27: The method of Clause 25 or 26, wherein, for a particular usage, different RNTIs are determined depending on the selected PCIs serving the UE.

Clause 28: The method of Clause 27, wherein the RNTI for the particular usage is configured to be different for different PCIs.

Clause 29: The method of Clause 27 or 28, wherein the RNTI for the particular usage is dynamically signaled when one or more PCIs serving the UE are updated.

Clause 30: A method for wireless communications performed by a network entity, comprising: transmitting signaling configuring a user equipment (UE) with multiple selected physical cell identifiers (PCIs) per serving cell serving the UE; determining at least one radio network temporary identifier (RNTI) based, at least in part, on at least one selected PCI of the multiple selected PCIs serving the UE and a particular usage of the RNTI; and using the RNTI for the particular usage when communicating with the UE.

Clause 31: An apparatus, comprising: at least one processor; and a memory coupled to the at least one processor, the memory including instructions executable by the at least one processor to cause the apparatus to perform a method in accordance with any one of Clauses 1-30.

Clause 32: An apparatus for wireless communication, comprising means for performing a method in accordance with any one of Clauses 1-30.

Clause 33: A non-transitory computer-readable medium for wireless communication comprising computer-executable instructions that, when executed by one or more processors of a processing system, cause the processing system to perform a method in accordance with any one of Clauses 1-30.

Clause 34: A computer program product for wireless communication embodied on a computer-readable storage medium comprising code for performing a method in accordance with any one of Clauses 1-30.

Additional Wireless Communication Network Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), ascertaining and the like. Also, "determining" may include receiving (for example, receiving information), accessing (for example, accessing data in a memory) and the like.

Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 7-10 may be performed by various processors shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-10.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications performed by a user equipment (UE), comprising:
receiving first signaling configuring the UE with multiple candidate target physical cell identifiers (PCIs) of at least one candidate target cell;
receiving second signaling configuring the UE with at least one handover (HO) condition for each PCI of the multiple candidate target PCIs;
receiving third signaling configuring the UE to perform measurements for at least one PHY layer metric for each PCI of the multiple candidate target PCIs;
detecting that an HO condition is satisfied for a target PCI of one or more target PCIs selected from the multiple candidate target PCIs for HO, wherein the HO condition for one or more PCIs of the multiple candidate target PCIs is based on the at least one PHY layer metric;
initiating an HO procedure to a target cell associated with the target PCI selected for HO and for which the HO condition is satisfied, the HO procedure involving transmitting a random access signal on an uplink (UL) resource configured for the target PCI; and
transmitting or receiving an HO complete message via physical (PHY) layer signaling or medium access control (MAC) layer signaling, the HO complete message indicating completion of the HO procedure.

2. The method of claim 1, wherein the HO complete message is conveyed via at least one of:
a MAC control element (MAC-CE);
a downlink control information (DCI); or
an uplink control information (UCI).

3. The method of claim 1, wherein the multiple candidate target PCIs belong to:
a same candidate target cell;
or multiple candidate target cells.

4. The method of claim 1, wherein the at least one PHY layer metric comprises at least one of a reference signal received power (RSRP) or a signal to interference and noise ratio (SINR).

5. The method of claim 1, wherein the random access signal comprises at least one of a random access channel (RACH) preamble or a UL reference signal (RS).

6. The method of claim 1, wherein:
the random access signal is based on a contention-free random access (CFRA); and
the UE receives the HO complete message from the target PCI.

7. The method of claim 6, wherein the HO complete message is contained in a downlink control information (DCI) scrambled with a radio network temporary identifier (RNTI) assigned to the UE for the target PCI.

8. The method of claim 1, wherein:
the random access signal is based on a contention-based random access (CBRA); and
the UE transmits the HO complete message to the target PCI.

9. The method of claim 8, wherein:
the HO complete message is contained in an uplink control information (UCI) carried via a physical uplink control channel (PUCCH) or a MAC control element (MAC CE) carried via a physical uplink shared channel (PUSCH); and
the HO complete message conveys a radio network temporary identifier (RNTI) assigned to the UE for the target PCI.

10. The method of claim 8, further comprising receiving, from the target PCI, acknowledgment (ACK) feedback or negative ACK (NACK) feedback for the HO complete message.

11. The method of claim 1, further comprising receiving third signaling enabling:
use of a PHY or MAC layer HO procedure;
use of a radio resource control (RRC) HO procedure; or
use of both the PHY or MAC layer HO procedure and the RRC HO procedure.

12. The method of claim 11, wherein when the UE receives the third signaling enabling use of both the PHY or MAC layer HO procedure and the RRC HO procedure, the PHY or MAC layer HO procedure and the RRC HO procedure are triggered independently when a corresponding layer 1 (L1) or layer 2 (L2) HO condition is satisfied.

13. The method of claim 11, wherein when the UE receives the third signaling enabling use of both the PHY or MAC layer HO procedure and the RRC HO procedure:
   the UE prioritizes one of the PHY or MAC layer HO procedure or the RRC HO procedure; and
   the UE uses the non-prioritized one of the PHY or MAC layer HO procedure or the RRC HO procedure when the prioritized one of the PHY or MAC layer HO procedure or the RRC HO procedure fails.

14. A method for wireless communications performed by a network entity, comprising:
   transmitting first signaling, to a user equipment (UE), configuring the UE with multiple candidate target physical cell identifiers (PCIs) of at least one candidate target cell;
   transmitting second signaling configuring the UE with at least one handover (HO) condition for each PCI of the multiple candidate target PCIs;
   transmitting third signaling configuring the UE to perform measurements for at least one PHY layer metric for each PCI of the multiple candidate target PCIs;
   participating in an HO procedure of the UE to a target cell associated with a target PCI of one or more target PCIs selected from the multiple candidate target PCIs for HO for which the HO condition is satisfied, the HO procedure involving the UE transmitting a random access signal on an uplink (UL) resource configured for the target PCI, wherein the HO condition for one or more PCIs of the multiple candidate target PCIs is based on the at least one PHY layer metric; and
   transmitting or receiving an HO complete message, via physical (PHY) layer signaling or medium access control (MAC) layer signaling, the HO complete message indicating completion of the HO procedure.

15. The method of claim 14, wherein the HO complete message is conveyed via at least one of:
   a MAC control element (MAC-CE);
   a downlink control information (DCI); or
   an uplink control information (UCI).

16. The method of claim 14, wherein the multiple candidate target PCIs belong to:
   a same candidate target cell; or
   multiple candidate target cells.

17. The method of claim 14, wherein the at least one PHY layer metric comprises at least one of a reference signal received power (RSRP) or a signal to interference and noise ratio (SINR).

18. The method of claim 14, wherein the random access signal comprises at least one of a random access channel (RACH) preamble or a UL reference signal (RS).

19. The method of claim 14, wherein:
   the random access signal is based on a contention-free random access (CFRA); and
   the network entity transmits, via the target PCI, the HO complete message.

20. The method of claim 14, wherein:
   the random access signal is based on a contention-based random access (CBRA); and
   the network entity receives, via the target PCI, the HO complete message.

21. The method of claim 20, further comprising transmitting, via the target PCI, acknowledgment (ACK) feedback or negative ACK (NACK) feedback for the HO complete message.

22. The method of claim 14, further comprising transmitting third signaling enabling:
   use of a PHY or MAC layer HO procedure;
   use of a radio resource control (RRC) HO procedure; or
   use of both the PHY or MAC layer HO procedure and the RRC HO procedure.

23. The method of claim 22, wherein when the network entity transmits the third signaling enabling use of both the PHY or MAC layer HO procedure and the RRC HO procedure, the PHY or MAC layer HO procedure and the RRC HO procedure are triggered independently when a corresponding layer 1 (L1) or layer 2 (L2) HO condition is satisfied.

24. The method of claim 22, wherein when the network entity transmits the third signaling enabling use of both the PHY or MAC layer HO procedure and the RRC HO procedure, further comprising configuring the UE to:
   prioritize one of the PHY or MAC layer HO procedure or the RRC HO procedure; and
   use the non-prioritized one of the PHY or MAC layer HO procedure or the RRC HO procedure when the prioritized one of the PHY or MAC layer HO procedure or the RRC HO procedure fails.

25. An apparatus for wireless communication by a user equipment (UE), comprising:
   one or more processors individually or collectively configured to execute instructions stored on one or more memories and to cause the UE to:
      receive first signaling configuring the UE with multiple candidate target physical cell identifiers (PCIs) of at least one candidate target cell;
      receive second signaling configuring the UE with at least one handover (HO) condition for each PCI of the multiple candidate target PCIs;
      receive third signaling configuring the UE to perform measurements for at least one PHY layer metric for each PCI of the multiple candidate target PCIs;
      detect that an HO condition is satisfied for a target PCI of one or more target PCIs selected from the multiple candidate target PCIs for HO, wherein the HO condition for one or more PCIs of the multiple candidate target PCIs is based on the at least one PHY layer metric;
      initiate an HO procedure to a target cell associated with the target PCI selected for HO and for which the HO condition is satisfied, the HO procedure involving transmitting a random access signal on an uplink (UL) resource configured for the target PCI; and
      transmit or receiving an HO complete message via physical (PHY) layer signaling or medium access control (MAC) layer signaling, the HO complete message indicating completion of the HO procedure.

26. The apparatus of claim 25, wherein the memory further includes instructions to cause the UE to receive third signaling configuring the UE to perform measurements for at least one PHY layer metric for each PCI of the multiple candidate target PCIs, wherein the HO condition for one or more PCIs of the multiple candidate target PCIs is based on the at least one PHY layer metric, wherein the at least one PHY layer metric comprises at least one of a reference signal received power (RSRP) or a signal to interference and noise ratio (SINR).

27. The apparatus of claim 25, wherein:
   the random access signal is based on a contention-free random access (CFRA);
   the UE receives the HO complete message from the target PCI; and the HO complete message is contained in a downlink control information (DCI) scrambled with a radio network temporary identifier (RNTI) assigned to the UE for the target PCI.

28. The apparatus of claim 25, wherein:
the random access signal is based on a contention-based random access (CBRA); and
the UE transmits the HO complete message to the target PCI;
the HO complete message is contained in an uplink control information (UCI) carried via a physical uplink control channel (PUCCH) or a MAC control element (MAC CE) carried via a physical uplink shared channel (PUSCH); and
the HO complete message conveys a radio network temporary identifier (RNTI) assigned to the UE for the target PCI.

29. The apparatus of claim 25, wherein the memory further includes instructions to cause the UE to receive third signaling enabling:
use of a PHY or MAC layer HO procedure;
use of a radio resource control (RRC) HO procedure; or
use of both the PHY or MAC layer HO procedure and the RRC HO procedure, wherein:
when the UE receives the third signaling enabling use of both the PHY or MAC layer HO procedure and the RRC HO procedure, the PHY or MAC layer HO procedure and the RRC HO procedure are triggered independently when a corresponding layer 1 (L1) or layer 2 (L2) HO condition is satisfied.

30. An apparatus for wireless communication by a network entity, comprising:
one or more processors individually or collectively configured to execute instructions stored on one or more memories and to cause the network entity to:
transmit first signaling, to a user equipment (UE), configuring the UE with multiple candidate target physical cell identifiers (PCIs) of at least one candidate target cell;
transmit second signaling configuring the UE with at least one handover (HO) condition for each PCI of the multiple candidate target PCIs;
transmit third signaling configuring the UE to perform measurements for at least one PHY layer metric for each PCI of the multiple candidate target PCIs;
participate in an HO procedure of the UE to a target cell associated with a target PCI of one or more target PCIs selected from the multiple candidate target PCIs for HO for which the HO condition is satisfied, the HO procedure involving the UE transmitting a random access signal on an uplink (UL) resource configured for the target PCI, wherein the HO condition for one or more PCIs of the multiple candidate target PCIs is based on the at least one PHY layer metric; and
transmit or receiving an HO complete message, via physical (PHY) layer signaling or medium access control (MAC) layer signaling, the HO complete message indicating completion of the HO procedure.

* * * * *